US012015328B2

(12) United States Patent
Roux et al.

(10) Patent No.: US 12,015,328 B2
(45) Date of Patent: Jun. 18, 2024

(54) END SHIELD AND ROTOR FOR A ROTARY ELECTRIC MACHINE

(71) Applicant: NIDEC PSA EMOTORS, Carrieres sous Poissy (FR)

(72) Inventors: Jean Baptiste Roux, Vaux sur Seine (FR); Juan Wang, Vernouillet (FR); Ioan Deac, Poissy (FR); Diana Fantuz, Plaisir (FR)

(73) Assignee: NIDEC PSA EMOTORS, Carrieres sous Poissy (FR)

( * ) Notice: Subject to any disclaimer, the term of this patent is extended or adjusted under 35 U.S.C. 154(b) by 0 days.

(21) Appl. No.: 18/254,376

(22) PCT Filed: Nov. 23, 2021

(86) PCT No.: PCT/FR2021/052068
§ 371 (c)(1),
(2) Date: May 24, 2023

(87) PCT Pub. No.: WO2022/112703
PCT Pub. Date: Jun. 2, 2022

(65) Prior Publication Data
US 2023/0344311 A1 Oct. 26, 2023

(30) Foreign Application Priority Data
Nov. 30, 2020 (FR) ...................................... 2012367

(51) Int. Cl.
*H02K 9/19* (2006.01)
*H02K 1/32* (2006.01)
*H02K 5/15* (2006.01)

(52) U.S. Cl.
CPC ................ *H02K 9/19* (2013.01); *H02K 1/32* (2013.01); *H02K 5/15* (2013.01)

(58) Field of Classification Search
CPC .. H02K 1/27–2783; H02K 1/32; H02K 1/325; H02K 5/15; H02K 9/19
(Continued)

(56) References Cited

U.S. PATENT DOCUMENTS

2012/0025642 A1 2/2012 Onimaru et al.
2017/0310190 A1 10/2017 Degner et al.
(Continued)

FOREIGN PATENT DOCUMENTS

JP 2005006429 A 1/2005
JP 2006025545 A 1/2006
(Continued)

OTHER PUBLICATIONS

Machine translation of JP-2015231262-A (Year: 2015).*
(Continued)

*Primary Examiner* — Daniel C Puentes
*Assistant Examiner* — Minki Chang
(74) *Attorney, Agent, or Firm* — Sandberg Phoenix & von Gontard P.C.

(57) ABSTRACT

The present invention relates to an end shield (10) for a rotary electric machine, including one or more feed channels (12) for feeding a coolant supplied from a channel formed in a rotor lamination stack (8) or in a shaft of the rotor or between the rotor lamination stack and the shaft, wherein at least one feed channel (12) has a spray portion (18) for spraying the coolant, said spray portion (18) being placed in the last two thirds of the feed channel (12), when considered in the direction in which the coolant circulates.

19 Claims, 17 Drawing Sheets

(58) Field of Classification Search
USPC ....... 310/60 R, 61, 156.22, 156.61, 216.114, 310/216.116, 400, 407, 409
See application file for complete search history.

(56) References Cited

U.S. PATENT DOCUMENTS

| | | |
|---|---|---|
| 2019/0319505 A1 | 10/2019 | Degner et al. |
| 2020/0036248 A1* | 1/2020 | Krais ..................... H02K 9/197 |
| 2020/0227978 A1* | 7/2020 | Yamaguchi .............. H02K 1/32 |

FOREIGN PATENT DOCUMENTS

| | | | |
|---|---|---|---|
| JP | 2010124559 A | | 6/2010 |
| JP | 2013115848 A | | 6/2013 |
| JP | 2015231262 A | * | 12/2015 |
| JP | 2015231262 A | | 12/2015 |
| JP | 2019161750 A | | 9/2019 |

OTHER PUBLICATIONS

International Search Report corresponding to PCT/FR2021/052068 mailed Feb. 28, 2022.
Written Opinion corresponding to PCT/FR2021/052068 mailed Feb. 28, 2022.

* cited by examiner

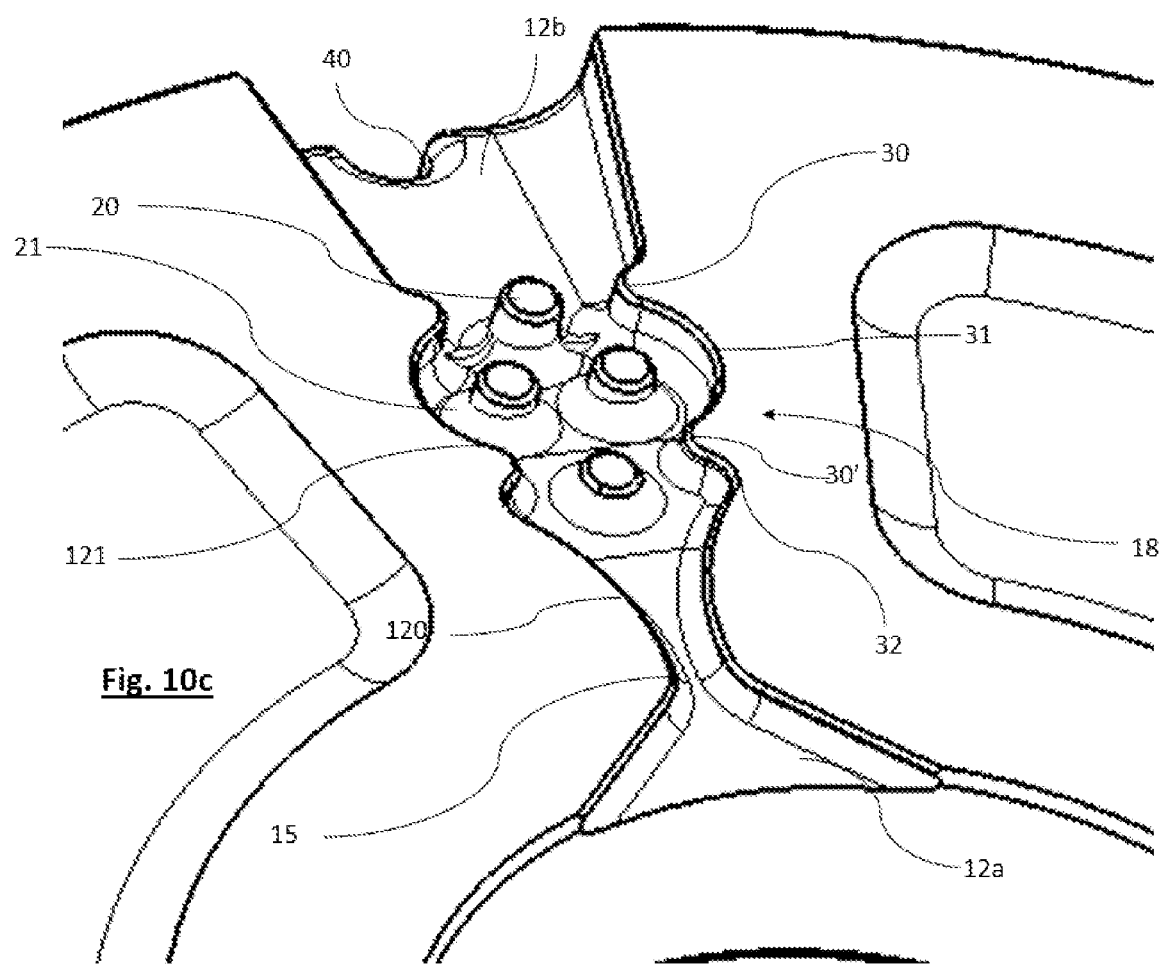

END SHIELD AND ROTOR FOR A ROTARY ELECTRIC MACHINE

CROSS-REFERENCE TO RELATED APPLICATIONS

This application is the US National Stage under 35 USC § 371 of International Application No. PCT/FR2021/052068, filed Nov. 23, 2021, which claims the priority of French application 2012367 filed on Nov. 30, 2020, the content (text, drawings and claims) of both said applications being incorporated by reference herein.

BACKGROUND

A rotary electric machine, and more particularly a rotary machine cooled by a circulation of a coolant, in particular oil, circulating at least partially in the shaft of the machine and, where appropriate, in a rotor lamination stack of a rotor of the machine is disclosed. In particular, rotors of such machines, and even more specifically the end shields, are disclosed.

More particularly, disclosed are synchronous or asynchronous AC machines. In particular, traction or drive machines for electric motor vehicles (Battery Electric Vehicles) and/or hybrid motor vehicles (Hybrid Electric Vehicles—Plug-in Hybrid Electric Vehicles), such as private cars, vans, trucks or buses are disclosed. Rotary electric machines for industrial and/or power generation applications, in particular naval, aerospace or wind turbine applications are also disclosed.

It is known to cool the coil heads of the stator of a rotary electric machine by a coolant ejected by the rotor on them during the operation of the machine.

In patent applications JP 2006-025545, JP 2013-115848, JP 2015-231262, JP 2005-006429 for example, the machine includes an end shield wherein a duct is formed, which has a constant cross-section from its inlet to its outlet, or with a variation having a single section between two portions which are each of constant cross-section.

In application JP 2010-124559, the oil is introduced into the end shield by an axially oriented orifice on the side opposite the rotor mass. This end shield is not supplied from a rotor lamination stack of the rotor.

There is a need to further improve the cooling of rotary electric machines cooled by a circulation of coolant.

The disclosed machine aims to meet this need and has for one object, according to a first of its aspects, a rotor end shield of a rotary electric machine, including one or more feed channels for a coolant supplied from a channel formed in a rotor lamination stack or a shaft of the rotor or between the rotor lamination stack and the shaft, at least one feed channel including a cross-sectional constriction, the cross-section of the feed channel decreasing then increasing in a radial direction relative to the rotational axis of the machine.

The constriction makes it possible to limit the flow rate of the coolant, and thus to promote a good distribution thereof in the rotor, and on either side thereof. This is particularly useful when the coolant is supplied by a central supply, in particular a single one. In the feed channel before the constriction, the pressure of the coolant is lower, which makes it possible to obtain a good distribution of the oil around the rotational axis of the rotor. It is thus possible to obtain improved cooling of the electrical conductors of the machine, thanks to a good distribution of the coolant on each of them. Even with a low flow rate of cooling oil, it is possible to obtain a very regular distribution of the coolant around the rotational axis of the rotor on all the electrical conductors of the machine.

"Cross-section of the feed channel" means a section taken in the plane perpendicular to the flow direction of the coolant in the feed channel.

The surface area of the cross-section of the constriction may be between 0.5 mm$^2$ and 5 mm$^2$, better still between 0.7 mm$^2$ and 3 mm$^2$, better still between 1 mm$^2$ and 2.5 mm$^2$, being for example of the order of 1.7 mm$^2$ or 2.4 mm$^2$. The shape of the cross-section of the constriction may be rectangular, square, circular, half-moon or other shapes, this list not being limiting.

The constriction may preferably be located in a first half of the feed channel, when moving in the direction of circulation of the coolant. The constriction may preferably be located in the first two-fifths of the feed channel, when moving in the direction of circulation of the coolant, better still in a first third, or even in a first quarter of the feed channel. The length of the feed channel is measured between the inlet thereof in the bottom of the end shield, at the shaft, and the top of the end shield, at the gap.

The channel(s) may be formed at least partially in the thickness of the end shield. The channel(s) may be formed at least partially recessed on one face of the end shield turned toward said rotor lamination stack.

The channel(s) may open on outlets arranged at the periphery of the end shield, through which the coolant is sprayed onto a stator of the machine. Each output can be supplied by at least one respective feed channel. The outlets may be formed recessed on one face of the end shield turned toward said rotor lamination stack.

The outlets may be oriented radially outward. The outlets may be situated on a radially outer edge face of the end shield, and/or on a face of the end shield turned towards said rotor lamination stack.

Each end shield can include a single outlet, or else between 1 and 8 outlets, for example 2, 4, 6 or 8. It may for example include an even number of outlets, or alternatively an odd number. The outlets of an end shield can for example be regularly distributed around the end shield, for example at 180° when the end shield includes 2 outlets, and at 90° when the end shield includes 4 outlets.

The feed channels may be oriented radially. Each end shield may include a single feed channel, or between 1 and 8 feed channels, for example 2, 4, 6 or 8. It may for example include an even number of feed channels, or alternatively an odd number. The feed channels of an end shield can for example be regularly distributed around the end shield, for example at 180° when the end shield includes 2 channels, and at 90° when the end shield includes 4 channels. The end shield can have a greater longitudinal dimension of between 5 mm and 20 mm, better still between 8 mm and 15 mm, being for example of the order of 12 mm.

The feed channels can each include an inlet on the side of the rotational axis of the rotor, said inlets being connected to one another at a radially inner end by an annular recess.

As a variant, the inlets are not connected to one another, each feed channel including for example an inlet portion flared in the direction of the rotational axis of the rotor. The annular recess or the flared inlet portion(s) can be used to collect the coolant coming from the rotor, and to distribute it in the different feed channels of the end shield. Such a configuration makes it possible to encourage regular distribution.

In the case of a flared inlet portion, the area of the flared inlet portion measured in a plane perpendicular to the rotational axis of the rotor can be between 10 mm² and 50 mm², better still between 20 mm² and 40 mm², being for example of the order of 30 mm².

In the case of an annular recess, the difference between the inner and outer diameters of this recess can be between 1 mm and 6 mm, better still between 2 mm and 5 mm, being for example of the order of 3.5 mm.

The annular recess may be delimited at least in part by the shaft. The annular recess can be delimited at least in part by the rotor lamination stack. The annular recess may be delimited at least in part by the end shield. In one preferred embodiment, the annular recess may be delimited by the shaft, by the rotor lamination stack and by the end shield.

When the end shield is observed along the rotational axis of the electric machine, the annular recess can be located between the shaft and the constriction of the feed channel.

An outer face of the end shield can be configured to limit the presence of coolant in the air gap and promote its spraying toward electrical conductors of the machine.

The end shield may be a cast part, in particular made of aluminum or aluminum alloy, in particular by pressure casting. The geometry of the end shield, with channels formed at the interface between the end shield and the rotor lamination stack or of simple shape, allows very simple manufacture without re-machining or drilling, or with repeated machining and drilling, but easy to produce. Other materials than aluminum can be used. In one variant, the end shield may be produced by machining.

The end shield can also include one or more coolant feed channels supplied from a rotor of rotor laminations of the rotor, at least one feed channel including a portion for spraying the coolant, this spraying portion being arranged in the second half of the feed channel, as seen when moving in the direction of circulation of the coolant. The spraying portion may be as described below.

The object is also, independently or in combination with the foregoing, a rotor end shield of a rotary electric machine, including one or more channels for supplying coolant supplied from a channel formed in a rotor lamination stack or in a shaft of the rotor or between the rotor lamination stack and the shaft, at least one feed channel including a portion for spraying the coolant. This spraying portion can be arranged in the last two-thirds of the feed channel, as seen when moving in the direction of circulation of the coolant. The spraying portion can be arranged in the second half of the feed channel, as seen when moving in the direction of circulation of the coolant. The end shield may include one or more of the features described above or below.

The spraying portion makes it possible to disperse the flow of coolant, and thus to promote the creation of a mist of droplets. "Mist of droplets" means a flow of coolant droplets. The coolant can mix with air. The coolant can thus be better distributed, in a balanced manner, and thus it is possible to promote a good distribution thereof in the rotor, and on either side thereof, to the electrical conductors of the machine. This is particularly useful when the coolant is supplied by a central supply, in particular a single source.

Furthermore, the disclosed devices make it possible to disperse a jet of coolant, in order to obtain a mist of liquid on electrical conductors of the rotary electric machine. The droplets created can be sprayed toward the electrical conductors, in particular the coil heads. These droplets can pass through the coil heads at their base, which further promotes their cooling.

The spraying portion is closer to the air gap and to the coil heads of the machine than to the rotational axis. It is in particular closer to the air gap and to the coil heads than to the surface of the shaft.

The spraying portion may include a channel portion arranged 360° in the end shield, i.e., the channel portion is cylindrical.

FIG. 3A is a cross-section of end shield taken along line A-A of FIG. 3.

FIG. 3B is a fragmentary bottom perspective view of the end shield taken in the direction of the arrows B-B of FIG. 2 showing the region of FIG. 3A.

This channel portion can have a length between 0.2 and 6 mm, better still between 1 and 4 mm, being for example of the order of 2.5 mm. The length of this channel portion may be between 0.4 and 11% of a radius of the end shield, better still between 2 and 8%, being for example of the order of 5% of a radius of the end shield.

A larger transverse dimension of this channel may be between 1 and 5 mm, better still between 1.5 mm and 3 mm, for example of the order of 2.5 mm.

In the spraying portion, the cross-section of the feed channel can decrease and then increase when moving away from the rotational axis of the machine.

The channel portion may be obtained by drilling.

It can extend along a longitudinal axis which extends in a plane perpendicular to the rotational axis of the rotor.

In one variant, its longitudinal axis can be inclined relative to this plane perpendicular to the rotational axis of the rotor, for example by an angle of between 0° and 15°, better still between 0° and 10°, for example of the order of 3°. For example, it may be parallel to a face of the end shield intended to face the lamination stack.

Alternatively or additionally, the spraying portion of the feed channel can include one or more pins arranged across the coolant flow.

The pins may be molded, cast as one part with the rest of the end shield. In one variant, the pins may be produced by electrical discharge machining, in particular with a copper matrix in a bath. In a further variant, the pins may be attached to the end shield. The pins can be re-machined, where appropriate. The pins can also be manufactured by a 3D printing method.

The pins may be oriented parallel to a rotational axis of the rotor. The pins can be oriented perpendicularly to a longitudinal axis of the feed channel.

The pins may have a generally cylindrical shape along an axis of revolution. In cross-section, their shape may be generally discoid, elliptical, polygonal, square, rectangular or otherwise; this list not being limiting. Alternatively, the pins may have a frustoconical shape. They may be flat at their free end, in order to promote good contact with the laminations of the lamination stack.

The end shield may include, for a spraying portion, a number of pins included between 1 and 20, better still between 2 and 15, or even between 3 and 12, in particular 4.

The pins may be arranged in one or more rows, for example one, two or three rows, being for example arranged in staggered rows. In the case where the pins are in several rows, they may be arranged in staggered rows.

A gap d between two pins, measured between their longitudinal axes, may be between 0.5 mm and 5 mm, better still between 1 mm and 3 mm, being for example of the order of 2 mm.

The pins may be arranged in regular staggered rows. A pin may be arranged at an equal distance from all the closest pins, in all directions. The gap d1 between two rows of pins, measured between their longitudinal axes, can be between 0.5 mm and 6 mm, better still between 2 mm and 5 mm, being for example of the order of 3.5 mm.

Alternatively, the pins may be arranged in irregular staggered rows, with rows spaced apart by a larger gap d2. A gap d2 may be between 1 mm and 7 mm, better still between 2 mm and 6 mm, for example of the order of 4.5 mm.

The pins may have a diameter of between 0.5 mm and 4 mm, better still between 1 mm and 3 mm, being for example of the order of 2 mm.

In one embodiment, the spraying portion may include four pins distributed in three rows. The first and the third row may include one pin and the second row may include pins. The pins may be arranged in regular or irregular staggered rows.

The pins may all be at equal distance from one another. Thus, there is no preferred passage for the coolant which then flows uniformly in the feed channel.

At least one pin, in particular the one or more pins in a third row, may include at least one fin, for example two fins. The fin(s) may extend along a plane perpendicular to the plane of the end shield.

The distance h1 between the first row of pins and the rotational axis of the rotor can be between 10 mm and 50 mm, better still between 15 mm and 40 mm, being for example of the order of 30 mm. The distance 11 between the centers of two pins of the second row may be between 1 mm and 8 mm, better still between 2 mm and 6 mm, being for example of the order of 4 mm.

The gap between the first and the second row may be greater than the gap between the second and third rows. The gap h2 between the first and the second row can be between 1 mm and 10 mm, better still between 2 mm and 6 mm, being for example of the order of 4.5 mm. A gap h3 between the second and the third row may be between 1 mm and 10 mm, better still between 2 mm and 5 mm, for example being of the order of 3.5 mm.

The pin of the first row can very particularly make it possible to diffuse the jet at low speed, that is to say at a speed of less than 5,000 rpm. The second row of two pins can very particularly make it possible to diffuse the jet at all the rotational velocities of the machine.

The second row advantageously includes two pins in order to be able to diffuse the jet satisfactorily in both directions of rotation of the machine. The third row can very particularly diffuse the jet at all speeds and thus make it possible to form the mist of droplets.

Each pin can have a free space around its periphery, that is, a space where there is no other pin or an edge of the channel. This free space can have the shape of a disc, in particular centered on the pin. When the free space is a disc, it may have a diameter of between 1 mm and 5 mm, better still between 2 mm and 4 mm, being for example of the order of 3 mm.

The edges of the feed channel, at the spraying portion, may have curved portions, in particular bumps and/or troughs. A trough corresponds to an increase in the width of the channel and a bump corresponds to a reduction in the width of the channel. The edges of the channel may have an alternation of troughs and bumps. For example, the edges of the channel, at the spraying portion, may each have between 1 and 5 bumps, in particular 2 bumps. The edges of the channel, at the spraying portion, may each have between 1 and 5 troughs, in particular 2 troughs. In a preferred embodiment, the edges of the channel each have two troughs and two bumps.

The distance between two pins may be substantially the same as the distance between a pin and a bump adjacent to this pin.

The troughs may have different radii of curvature. For example, at least one of the troughs may have a radius of curvature greater than the other troughs. Thus, the edges of the channel may include small troughs and large troughs. The radius of curvature of the small troughs can be between 0.2 mm and 3 mm, better still between 0.5 mm and 2 mm, being for example of the order of 1 mm. The radius of curvature of the large troughs can be between 1 mm and 5 mm, better still between 2 mm and 4 mm, being for example of the order of 3 mm. A large trough can be arranged between two bumps.

The bumps may all have the same radius of curvature. The radius of curvature of the bumps may be equal to that of the small trough. The radius of curvature of the bumps may be between 0.2 mm and 3 mm, better still between 0.5 mm and 2 mm, for example of the order of 1 mm. The bumps may be aligned with one or more pins. As a variant, the bumps may be offset, in particular slightly, relative to one or more pins. The distance h5 between the center of a bump and the center of an adjacent small trough is between 0.5 mm and 5 mm, better still between 1 mm and 3 mm, being for example of the order of 1.7 mm.

The troughs make it possible to provide sufficient space around the pins to allow the manufacture of the end shield by casting. Thanks to these spaces, it is possible to use sufficiently wide pins without risk of the pins breaking and to ensure that the mold used is sufficiently strong.

The alternation of troughs and bumps makes it possible to orient the flow of coolant in the channel and in particular to cause it to be properly sprayed onto the pins so that the mist of droplets can form.

The ratio between the radius of curvature of the large troughs and the diameter of the pins may be between 0.2 and 3, better still between 1 and 2, being for example of the order of 1.33.

The distance 12 between the tops of two bumps arranged face to face can be between 1 mm and 10 mm, better still between 3 mm and 8 mm, being for example of the order of 6 mm.

The distance 13 between the bottoms of two small troughs arranged face-to-face can be between 3 mm and 12 mm, better still between 4 mm and 10 mm, being for example of the order of 7.5 mm.

The ratio of the distance 12 between the tops of two bumps arranged face-to-face to the diameter of the pins can be between 1 and 6, better still between 1.5 and 5, being for example of the order of 3.

The distance 13 between the bottom of a small trough and a constriction of a feed channel can be between 3 mm and 12 mm, better still between 5 mm and 10 mm, being for example of the order of 7.8 mm.

A surface area of the cross-section of the spraying portion may be between 3 $mm^2$ and 30 $mm^2$, better still between 5 $mm^2$ and 25 $mm^2$, being for example, of the order of 15 $mm^2$. The surface area of the cross-section of the spraying portion is calculated by deducting that of any pins. The shape of the cross-section of the spraying portion may be rectangular, square, circular, half-moon or other, this list not being limiting.

The spraying portion may preferably be located in the last two-fifths of the feed channel, when moving in the direction of circulation of the coolant, better still in a last third, or even in a last quarter of the feed channel.

The length D2 of the feed channel is measured between the inlet thereof in the bottom of the end shield, at the shaft, and the top of the end shield, at the gap. The length D2 of the feed channel may be between 20 mm and 100 mm, better still between 25 mm and 80 mm, being for example of the order of 33 mm.

The length D of the feed channel before the spraying portion may be between 10 mm and 50 mm, better still between 15 mm and 40 mm, being for example of the order of 26 mm.

A ratio D/D2 may be between 0.5 and 1, better still between 0.6 and 0.9, being for example of the order of 0.8.

The edges of the feed channels located between the inlet and the spraying portion may be convex. In one variant, the edges of the feed channels located between the inlet and the spraying portion may be substantially rectilinear. When the edges of the feed channels located between the inlet and the spraying portion are substantially rectilinear, the edges may be inclined at an angle γ relative to a plane containing the rotational axis of the machine and tangent to a constriction of the feed channel. The angle of inclination γ may be between 15° and 30°, better still between 20° and 25°, for example of the order of 22.5°. Such an inclination makes it possible to orient the flow of coolant in particular towards the pins furthest from the rotational axis of the machine.

The end shield can include a flared terminal portion, in particular located after the spraying portion, when moving in the direction of circulation of the coolant. The flared terminal portion opens onto the outer edge of the end shield. It makes it possible to orient the coolant toward the stator, and in particular the electrical conductors thereof, and in particular the coil heads.

The flared terminal portion includes a bottom inclined at an angle α relative to a plane perpendicular to the rotational axis of the rotor. The angle α may be between 2° and 30°, better still between 10° and 20°, being for example of the order of 15°. This inclined bottom makes it possible to provide access to the coolant to the end of the end shield.

The flared terminal portion can form a flare angle β in this plane perpendicular to the rotational axis of the rotor. The flare angle β may be between 10° and 50°, better still between 20° and 40°, being for example of the order of 30°. The flare angle β makes it possible to have a more or less wide coolant area on the coil heads.

The flared terminal portion may include a notch arranged on the edge face of the end shield and oriented radially. This notch makes it possible to facilitate the orientation and indexing of the end shield.

The object is also, independently or in combination with the foregoing, a rotor end shield of a rotary electric machine, including one or more coolant feed channels supplied from a rotor lamination stack, at least one feed channel including a coolant spraying portion, this spraying portion being arranged in the second half of the feed channel, as seen when moving in the direction of circulation of the coolant, the end shield further including at least one feed channel further including a cross-sectional constriction, the cross-section of the feed channel decreasing then increasing in a radial direction relative to the rotational axis of the machine. The constriction may particularly be located in a first half of the feed channel, when moving in the direction of circulation of the coolant. The constriction and the spraying portion can be separated by a channel portion wherein the cross-section of the feed channel is wider than in the constriction and in the spraying portion.

The end shield may include at least one feed channel including a portion for spraying the coolant, this spraying portion being arranged in the second half of the feed channel, as seen when moving in the direction of circulation of the coolant, as well as a constriction of cross-section, the cross-section of the feed channel decreasing then increasing in a radial direction relative to the rotational axis of the machine.

Rotor

Another object is a rotor including a rotor lamination stack and at least one end shield as defined above. The end shield may be arranged at one end of the rotor lamination stack.

In one embodiment, the rotor includes a rotor lamination stack and two end shields each arranged at one end of the rotor lamination stack.

At least one axial channel distributing coolant toward the at least one end shield may be formed in the rotor lamination stack or between the rotor lamination stack and the shaft, along the latter. This or these axial distribution channels can pass axially through at least a portion of the laminations of the rotor lamination stack. The circulation of the coolant in the rotor may be symmetrical relative to a plane perpendicular to the rotational axis of the rotor.

The or each feed channel and/or the annular recess and/or the flared portion(s) can face at least one axial distribution channel of the rotor lamination stack.

The rotor may include permanent magnets inserted into the rotor lamination stack. It may include permanent magnets, in particular surface or buried magnets. The rotor may have a flow concentration. It can include one or more layers of magnets arranged in an I, U or V shape. The housings of the permanent magnets can be produced entirely by cutting into the laminations. Each lamination of the stack of laminations can be made of a single piece.

Alternatively, it may be a wound or squirrel cage rotor, or a switched reluctance rotor.

A number of poles P at the rotor is for example between 4 and 48, being for example 4, 6, 8, 10 or 12.

The diameter of the rotor may be less than 400 mm, better still less than 300 mm, and greater than 50 mm, better still greater than 70 mm, being for example between 100 and 200 mm.

Each lamination is for example cut from a sheet of magnetic steel or containing magnetic steel, for example steel 0.1 to 1.5 mm thick. The laminations may be coated with an electrically insulating varnish on their opposite faces before they are assembled within the stack. The electrical insulation can also be obtained by heat treatment of the laminations, where appropriate.

The rotor magnetic mass may include salient poles. The poles can be made from the same piece as the rest of the rotor mass, or attached thereto.

The shaft can be made of a magnetic material, which advantageously makes it possible to reduce the risk of saturation in the rotor mass and to improve the electromagnetic performance of the rotor.

In one variant, the rotor includes a nonmagnetic shaft on which the rotor mass is arranged. The shaft can be made at least in part from a material from the following list, which is not limiting: steel, stainless steel, titanium or any other non-magnetic material.

In one embodiment, the rotor mass may be arranged directly on the nonmagnetic shaft, for example without an intermediate rim. In one variant, particularly in the case where the shaft is not nonmagnetic, the rotor may include a rim surrounding the rotor shaft and bearing thereupon.

The rotor mass may include one or more holes to lighten the rotor, to allow it to be balanced, or to assemble the rotor laminations constituting it. Holes can allow passage of tie rods now integral with the sheets.

The laminations may be cut in a tool, one after another. They can be stacked and clipped or glued into the tool, in complete stacks or sub-stacks. The laminations may be snap-fastened to one another. Alternatively, the stack of laminations can be stacked and welded outside the tool.

The rotor mass may have an outer contour which is circular or multilobed, a multilobed shape potentially being useful for example to reduce the torque ripples or the current or voltage harmonics.

The rotor may be mounted so as to be cantilevered or not, relative to the bearings used to guide the shaft.

The rotor can be made in several sections aligned in the axial direction, for example at least two sections. Each of the sections may be angularly offset relative to the adjacent pieces ("step skew").

The coolant may be oil. The coolant can circulate in the housings of the permanent magnets, or between the shaft and the stack of laminations. The coolant can be in direct contact with the permanent magnets of the rotor on a part of an external surface of said permanent magnets, so as to optimally capture calories to be evacuated and thus protect the permanent magnets of the rotor. "Direct contact" means physical contact with the external surface of the permanent magnets, which may optionally be covered with a protective varnish.

Machine and Stator

Another object is a rotary electric machine, including a rotor as defined hereinbefore. The machine may be used as a motor or as a generator. The machine may be a reluctance machine. It may be a synchronous motor or, alternatively, a synchronous generator. Alternatively still, it is an asynchronous machine.

The maximum rotational speed of the machine may be high, being for example higher than 10,000 rpm, preferably higher than 12,000 rpm, for example from of the order of 14,000 rpm to 15,000 rpm, or even 20,000 rpm, 24,000 rpm or 25,000 rpm. The maximum rotational speed of the machine may be lower than 100,000 rpm, or lower than 60,000 rpm, or even lower than 40,000 rpm, and preferably lower than 30,000 rpm.

The machine may be most particularly suitable for high-power machines.

The machine may include a single inner rotor or, alternatively, an inner rotor and an outer rotor, which are arranged radially on either side of the stator and are rotationally coupled.

The machine may be placed into a casing on its own or be inserted in a gearbox casing. In this case, it is placed in a casing that also houses a gearbox.

The machine includes a stator. The stator includes teeth which define notches between them. The stator may include electrical conductors, and at least some of the electrical conductors, or even most of the electrical conductors, may be in the form of U—or I-shaped pins.

The feed channel(s) may open opposite the coil heads of the stator. The coil heads of the stator are the parts of the electrical conductors of the stator that exceed the stator mass.

The machine may include a shaft covered over at least a portion of its length by an inner channel for supplying coolant. The shaft might not be traversed over its entire length by a flow of coolant in a single direction. On the contrary, it might be traversed by a flow of coolant over about half its length. The inner channel of the shaft may include a first axial portion over half the length of the shaft, and a second radial portion configured to conduct the coolant from the first portion to the lamination stack, and in particular to the axial coolant distribution channel formed in the rotor lamination stack or between the rotor lamination stack and the shaft, along the latter.

The notches may be at least partially closed. A partially closed notch makes it possible to provide an opening at the air gap, which can be used for example to install the electrical conductors for filling the notch. A partially closed notch is in particular formed between two teeth which each include pole shoes at their free end, which close the notch at least in part.

Alternatively, the notches can be fully closed. The term "fully closed notch" denotes notches which are not open radially toward the air gap.

In one embodiment, at least one notch, or even each notch, can be continuously closed on the side of the air gap by a material bridge made from the same piece as the teeth defining the notch. All the notches can be closed on the side of the air gap by material bridges closing the notches. The material bridges may be made from the same piece as the teeth defining the notch. The stator mass in such a case has no cut between the teeth and the material bridges closing the notches, and the notches are then continuously closed on the side of the air gap by the material bridges made from the same piece as the teeth defining the notch.

Furthermore, the notches can also be closed on the side opposite the air gap by a yoke that is attached to or made from the same piece as the teeth. The notches are then not open radially outward. The stator mass may have no gap between the teeth and the yoke.

In one embodiment, each of the notches has a continuously closed contour. "Continuously closed" means that the notches have a continuous closed contour when they are observed in cross-section, taken perpendicular to the rotational axis of the machine. It is possible to go all the way around the notch without encountering a gap in the stator mass.

The stator mass can be produced by stacking magnetic laminations, the notches being formed by cutting the laminations. In one variant, the stator mass may be produced by cutting into a mass of sintered or agglomerated magnetic powder. The closing of the notches on the side of the air gap is obtained by material bridges made from the same part as the rest of the laminations or of the block forming the stator mass.

The stator may lack attached magnetic shims for closing the notches. This eliminates the risk that these shims will accidentally become detached.

The stator may include coils arranged in a distributed manner in the notches, in particular having electrical conductors arranged in a row in the notches. "Distributed" means that at least one of the coils passes successively into two non-adjacent notches.

The electrical conductors may not be arranged in the notches loosely, but rather in an ordered manner. They are stacked in the slots in a non-random manner, being for example arranged in rows of aligned electrical conductors. The stack of electrical conductors is for example a stack according to a hexagonal network in the case of electrical conductors of circular cross-section.

The stator may include electrical conductors housed in the slots. At least some of the electrical conductors, or even a majority of the electrical conductors, may be in the form of U or I pins. The pin can be U-shaped ("U-pin") or straight, being I-shaped ("I-pin").

Each electrical conductor may include one or more strands (or "wires"). "Strand" means the most elementary unit for electrical conduction. A strand may have a round cross-section, in which case it may be called a "wire", or flat. The flat strands can be shaped into pins, for example U-pins or I-pins. Each strand is coated with an insulating enamel.

The electrical conductors may form a single winding, in particular full or fractional. "Single winding" means that the electrical conductors are electrically connected together in the stator, and that the connections between the phases are made inside the stator, not outside the stator, for example in a terminal box. A winding consists of a number of phases m offset in space in such a way that when powered by a multi-phase current system, they produce a rotating field. The winding can be full or fractional. The winding may be full-pitch with or without shortening, or in a fractional variant. In one embodiment, the electrical conductors form a fractional winding, in particular with a shortened pitch.

The winding can be waved. The electrical conductors can be placed in series in a so-called wave winding. The term "wave winding" is understood to mean a winding wherein the electrical conductors of the same phase and of the same pole are electrically connected to one another so that, for a winding path, the electric current of the phase circulates in the electrical conductors by rotating about the rotational axis of the machine, always in a single direction. For a winding path, the electrical conductors of the same phase and of the same pole do not overlap when observed perpendicular to the rotational axis of the machine.

The winding can include a single winding path or several winding paths. In an "electrical conductor", the current of the same phase circulates via a winding path. "Winding path" means all of the electrical conductors of the machine that are traversed by the same electric current of the same phase. These electrical conductors may be connected together in series or in parallel or in series-parallel. In the case where there is a single path, the electrical conductors are connected in series. In the case where there are several paths, the electrical conductors of each path are connected in series, and the paths are connected in parallel.

The electrical conductors can thus form a distributed winding. The winding may be unconcentrated or wound on a tooth.

In an alternative embodiment, the stator has a concentrated winding. The stator may include teeth and coils arranged on the teeth. The stator can thus be wound on teeth, in other words with non-distributed winding.

The teeth of the stator may include pole shoes. In one variant, the teeth of the stator are devoid of pole shoes.

The stator may include an outer casing surrounding the yoke.

The teeth of the stator can be produced with a stack of magnetic laminations, each covered with an insulating varnish, in order to limit the losses from induced currents.

Methods

The object is also, independently or in combination with the foregoing, a method for manufacturing a rotor as defined above.

The object is also, independently or in combination with the foregoing, a method for cooling a rotary electric machine as defined above. The cooling method may include the following step: making the coolant circulate in opposite directions within the rotor, then projecting the coolant onto the coil heads of the stator.

BRIEF DESCRIPTION OF THE DRAWINGS

The disclosed machine will be better understood on reading the following description of non-limiting examples of implementation thereof, and on examining the appended drawing, wherein:

FIG. 10b is a perspective view of the end shield of FIG. 10a.

FIG. 10c is another perspective view of the end shield of FIG. 10a.

FIG. 10d is a view similar to FIG. 6 of the end shield of FIG. 10a.

FIG. 11b is a perspective view of the end shield of FIG. 11a.

DETAILED DESCRIPTION

In the figures and in the rest of the description, the same references represent identical or similar elements.

Figure 1:
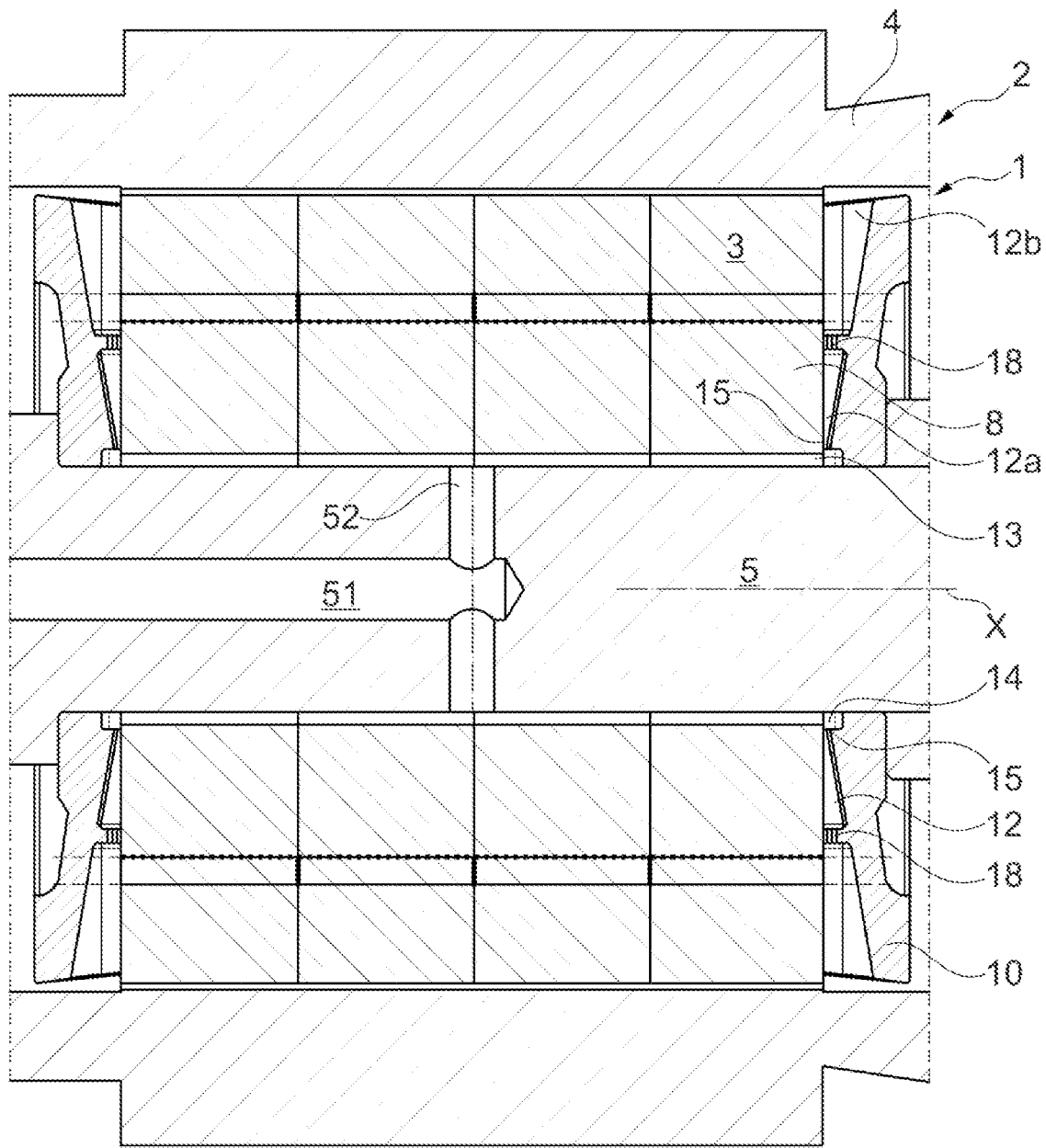
FIG. 1 is a schematic and partial longitudinal sectional view of a rotor.
Figure 2:
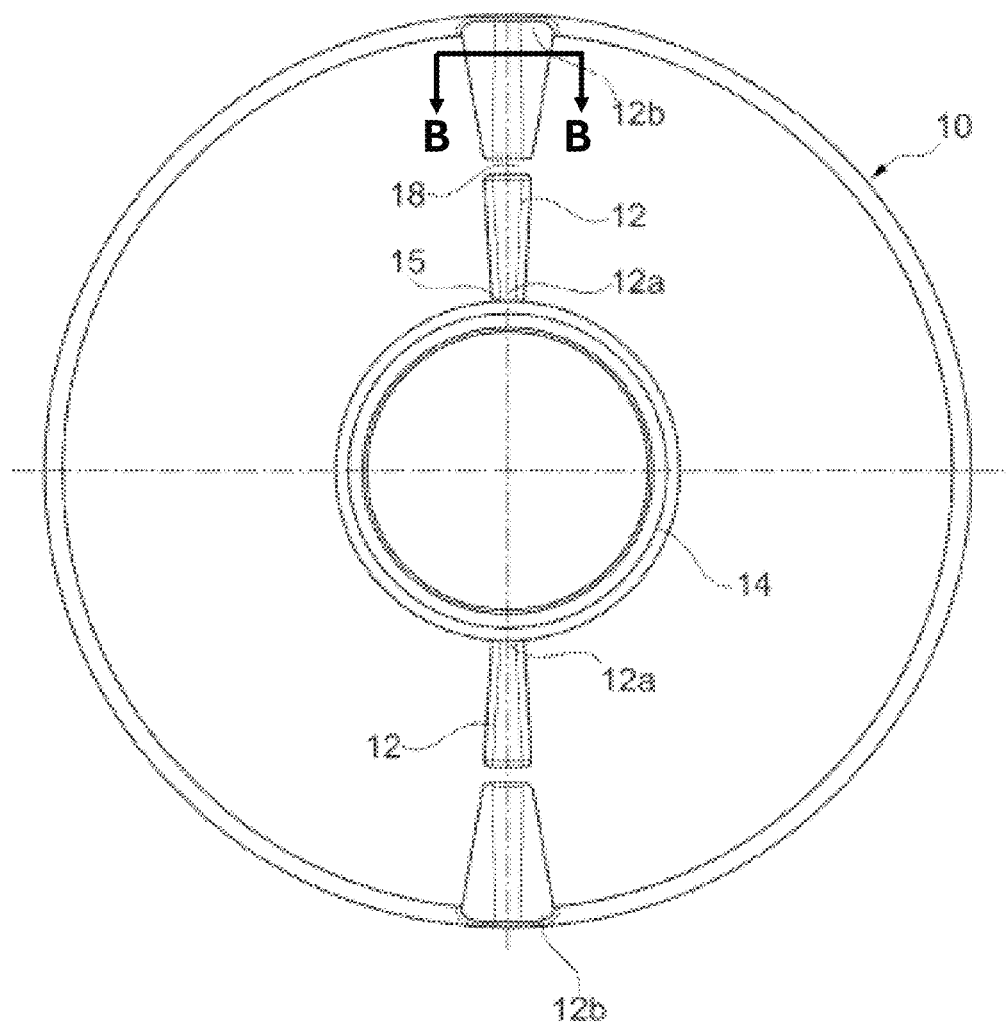
FIG. 2 is a front view of an end shield of the rotor of FIG. 1.
Figure 3:
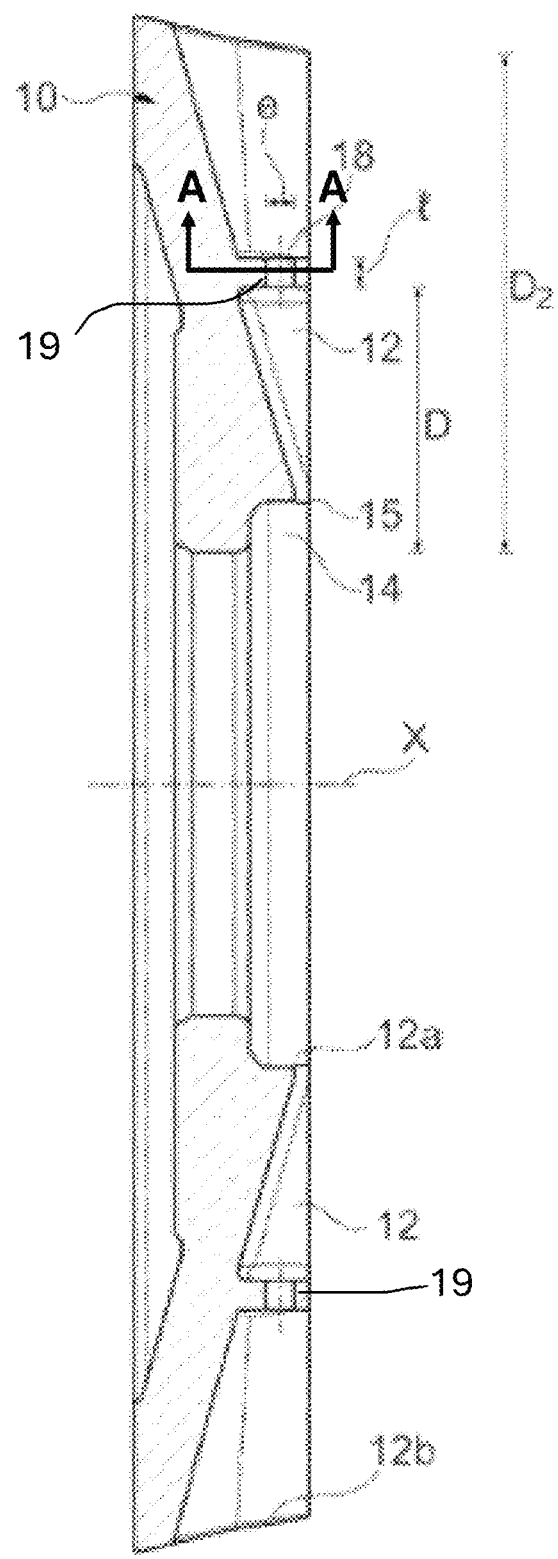
FIG. 3 is a schematic and partial sectional view of the end shield of FIG. 2.
Figure 3A:
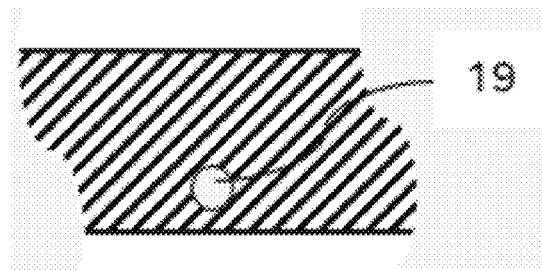
Figure 3B:
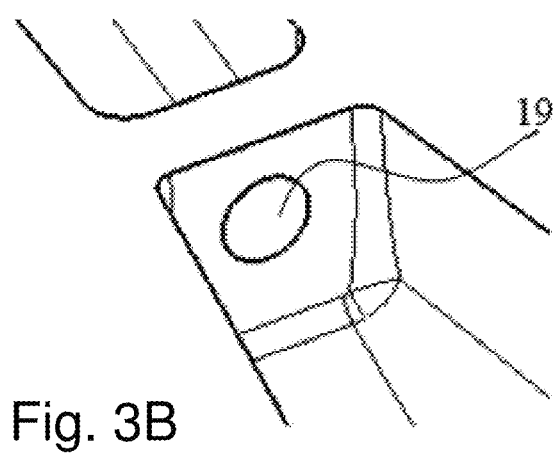
Figure 4:
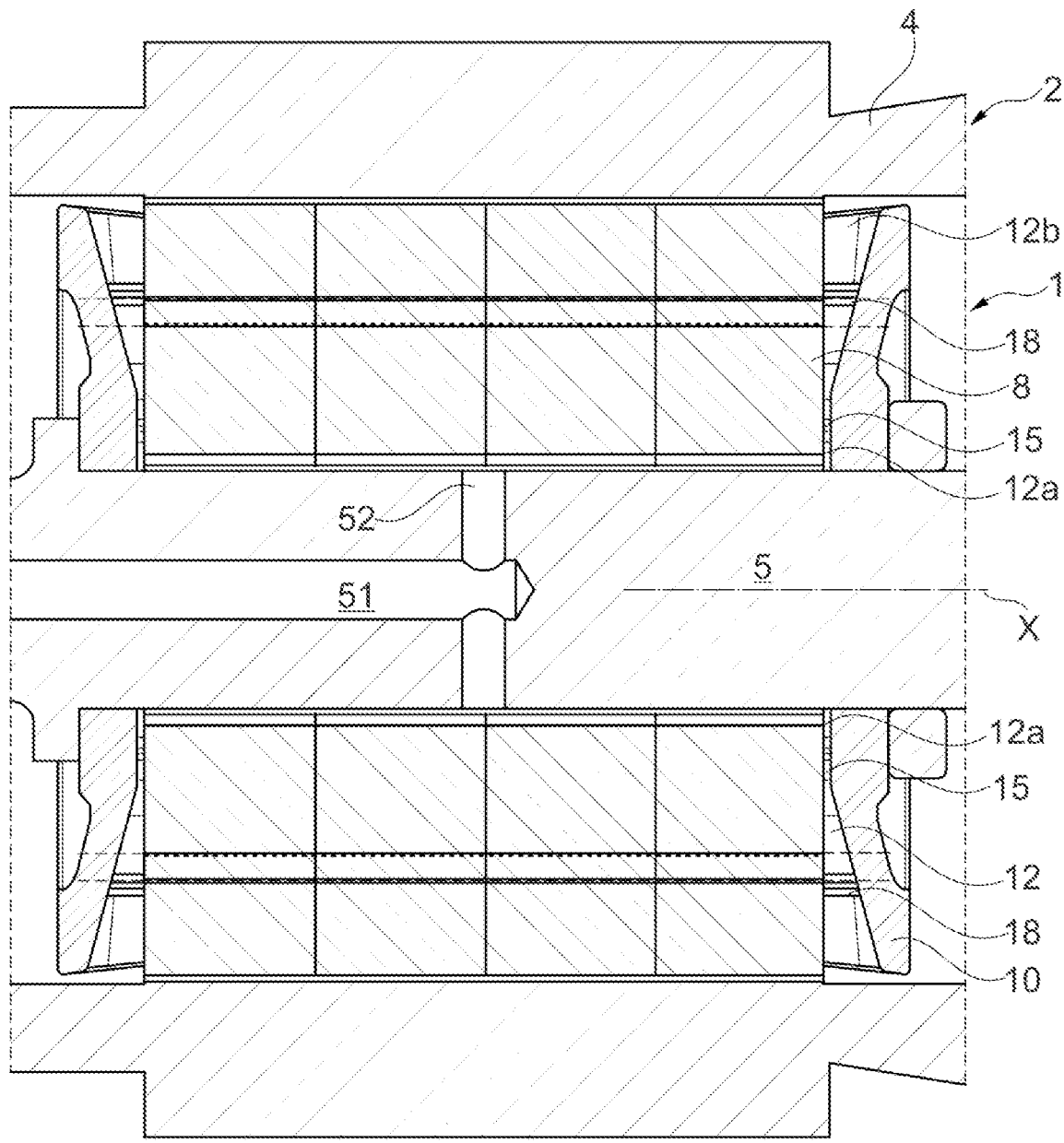
FIG. 4 is a view similar to FIG. 1 of an alternative embodiment.

FIGS. 1 to 3 show an inner rotor 1 of a rotary electric machine, also including an outer stator 2. The stator 2 makes it possible to generate a rotating magnetic field for rotating the rotor 1, in the context of a synchronous motor, and in the case of an alternator, the rotation of the rotor induces an electromotive force in the electrical conductors 4 of the stator 2.

The rotor 1 shown in FIG. 1 includes a magnetic rotor mass 3 extending axially along the rotational axis X of the rotor, this rotor mass being formed by a rotor lamination stack 8 stacked along the axis X, the laminations for example being identical and exactly superimposed. The magnetic laminations are preferably made of magnetic steel. All of the magnetic steel shades can be used.

The rotor mass 3 includes a central opening for mounting on a shaft 5. In the example considered, the shaft can be made of a nonmagnetic material, for example made of nonmagnetic stainless steel or aluminum, or on the contrary being magnetic.

The rotor 1 includes two end shields 10 each arranged at one end of the rotor lamination stack 8.

Each of the end shields 10 includes two feed channels 12 for a coolant, both oriented radially and fed from the rotor lamination stack of the rotor. These two feed channels 12 are arranged at 180°, as can be seen in FIG. 2, and they are supplied from an axial channel 13 for distributing the coolant to the end shield which is formed between the rotor lamination stack 3 and the shaft 5, along the latter. This axial distribution channel 13 is fed by a central channel 51 of the shaft 5, which communicates with radial channels 52. The circulation of the coolant in the rotor is symmetrical relative to a plane perpendicular to the rotational axis X of the rotor.

The feed channels 12 of the end shields 10 each include an inlet 12a on the side of the rotational axis X of the rotor 1, said inlets being connected to one another at a radially inner end by an annular recess 14. The annular recess 14 serves to collect the coolant coming from the rotor, and to distribute it in the two feed channels of the end shield. The difference between the inner and outer diameter of this recess is in the example described of the order of 3.5 mm.

The feed channels 12 further include an outlet 12b on the opposite side, at the coil heads of the electrical conductors 4. The outlets 12b are arranged at the periphery of the end shield, on a radially outer edge face of the end shield, and oriented radially outwards, allowing the spraying of the coolant on the stator. The outlets are formed in a trough on one face of the end shield turned toward the rotor lamination stack 3, as shown in FIG. 1. In the example described, each end shield includes two outlets 12b, distributed around the end shield at 180°.

The channel(s) are formed in the thickness of the end shield, more precisely recessed on a face of the end shield turned toward said rotor lamination stack 8.

Each of the two channels 12 further includes a constriction 15 of its cross-section, the cross-section of the feed channel 12 decreasing then increasing in a radial direction relative to the rotational axis X, which makes it possible to limit the flow rate of the coolant, and thus to promote a good distribution thereof in the rotor, and on either side of the rotor.

The surface area of the cross-section of the constriction 15 can in the example described be of the order of 1.7 mm².

The constriction 15 is located in a first half of the feed channel, when moving in the direction of circulation of the coolant, near the annular recess 14.

An outer face of each end shield has an inclination oriented toward the shaft 5, which makes it possible to limit the presence of coolant in the air gap and to promote its projection toward electrical conductors of the machine.

Furthermore, each feed channel 12 includes a coolant spraying portion 18, this spraying portion 18 being arranged in the second half of the feed channel, when moving in the direction of circulation of the coolant. The spraying portion 18 makes it possible to disperse the flow of coolant, and thus to promote the creation of a mist of droplets. In the spraying portion 18, the cross-section of the feed channel can decrease and then increase in a radial direction relative to the rotational axis of the machine.

In the example described, the spraying portion 18 includes a channel portion 19 formed at 360° in the end shield, which can be obtained by drilling. The channel portion 19 is thus cylindrical. Here, this channel portion has a length/of the order of 2.5 mm. A larger transverse dimension of this channel is of the order of 2.5 mm.

In the example described, it extends along a longitudinal axis which extends in a plane perpendicular to the rotational axis of the rotor. In one variant, its longitudinal axis could be inclined relative to this plane perpendicular to the rotational axis of the rotor.

In a variant embodiment shown in FIGS. 4 to 8, the spraying portion of the feed channel includes pins 20 arranged across the flow of coolant. These pins 20 may be molded, cast as one part with the rest of the end shield.

In the example described, the pins 20 are oriented parallel to a rotational axis of the rotor and perpendicular to a longitudinal axis of the feed channel 12.

Figure 5:
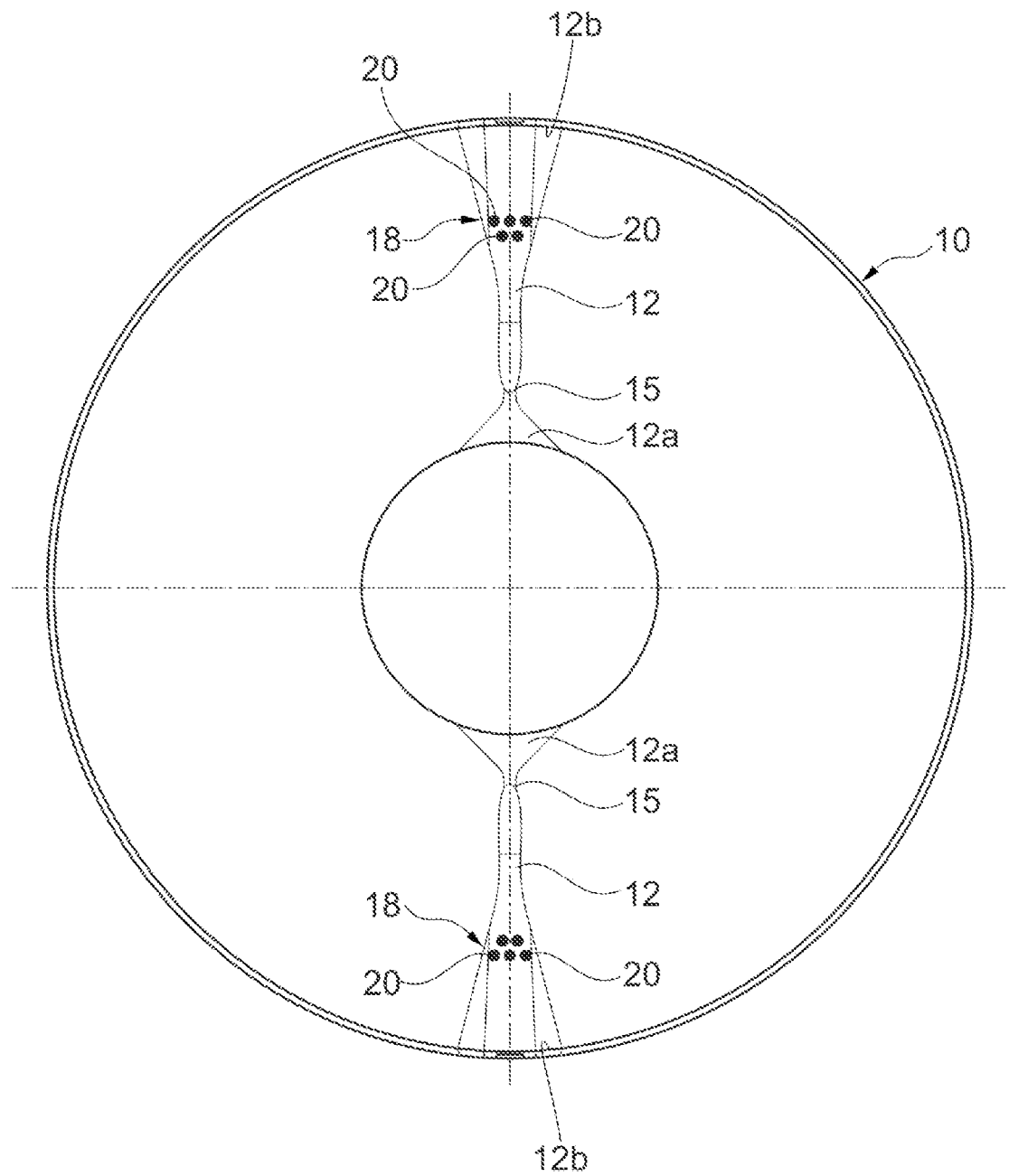
FIG. 5 is a front view of an end shield of the rotor of FIG. 4.

The pins 20 are generally cylindrical along an axis of revolution, and in cross-section have the general shape of a disk, as shown in FIG. 5. They are also flat at their free end, in order to promote good contact with the laminations of the lamination stack.

Figure 8:
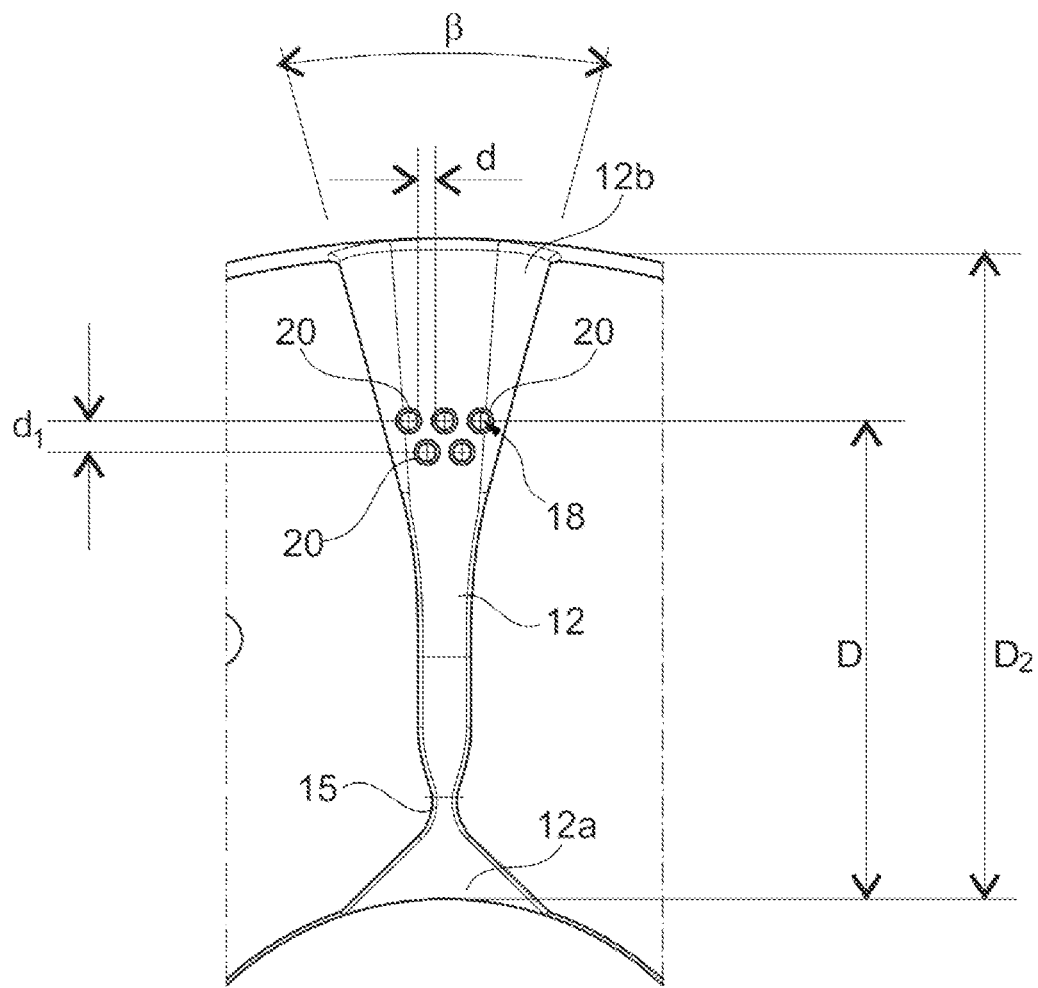
FIG. 8 is a view in detail, in cross-section, of the end shield of FIGS. 4 to 6.

In this example, the pins 20 are arranged in two rows, here of two and three pins respectively, and staggered. The gap d between two pins, measured between their longitudinal axes, is of the order of 1 mm, as shown in FIG. 8. In this example, the pins are arranged in regular staggered rows, a pin being arranged at an equal distance from all the closest pins, in all directions. The gap d1 between two rows of pins, measured between their longitudinal axes, is of the order of 1.7 mm.

As a variant, the pins could be arranged otherwise.

Figure 9A:
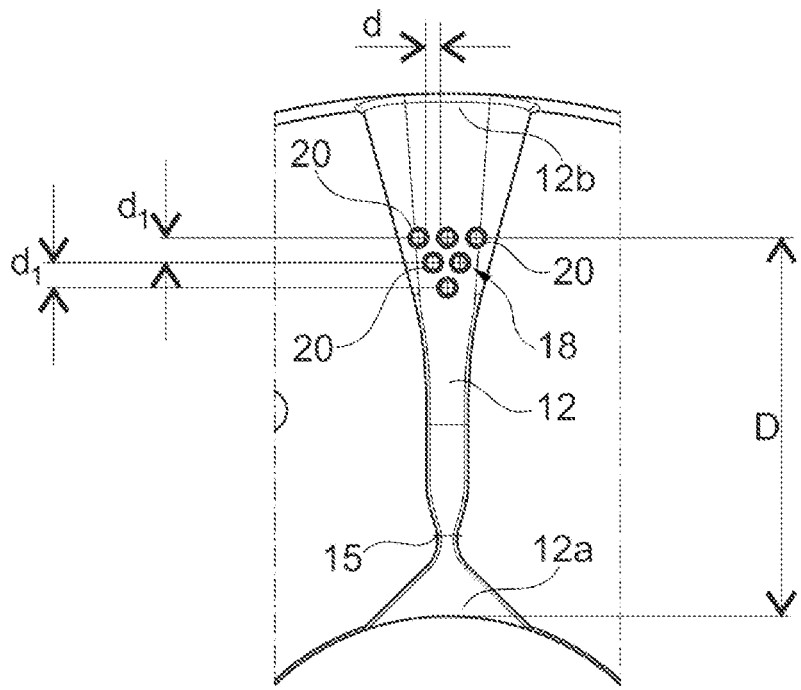
FIG. 9a is a view similar to FIG. 8 of an alternative embodiment.

In the example of FIG. 9a, they are arranged in three rows, here respectively of one, two and three pins, and in a regular staggered arrangement as in FIG. 8, with a gap d1 between two rows of pins which here is of the order of 1.7 mm.

Figure 9B:
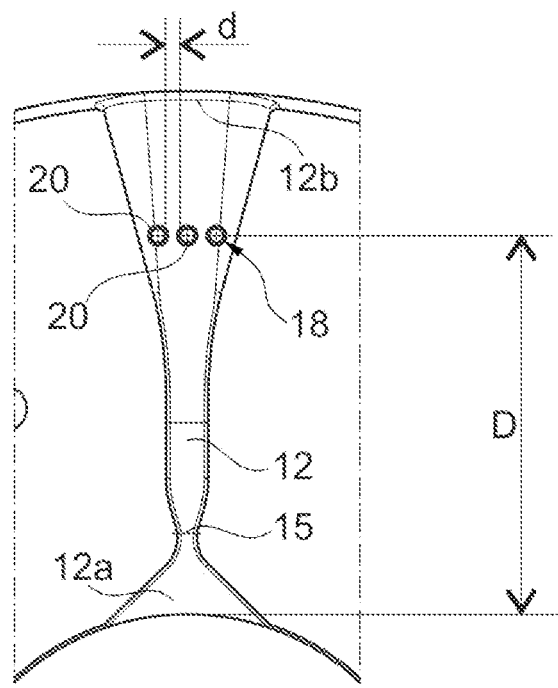
FIG. 9b is a view similar to FIG. 8 of an alternative embodiment.

Alternatively, the spraying portion 18 may include only one row, as shown in FIG. 9b, which includes a single row of three pins.

Figure 9C:
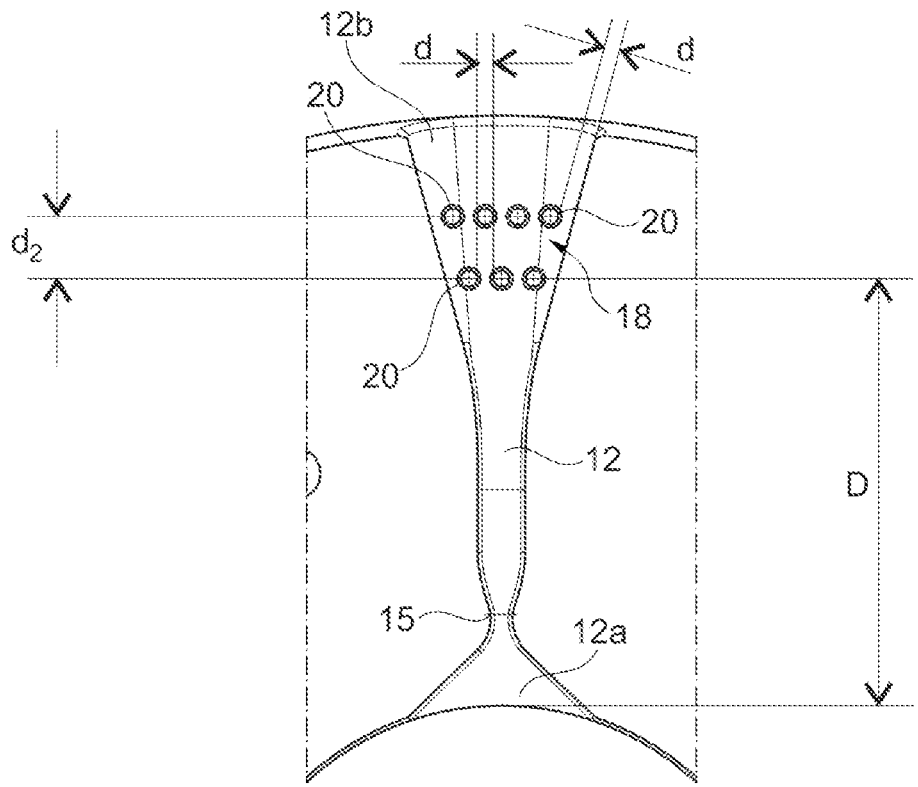
FIG. 9c is a view similar to FIG. 8 of an alternative embodiment.
Figure 9D:
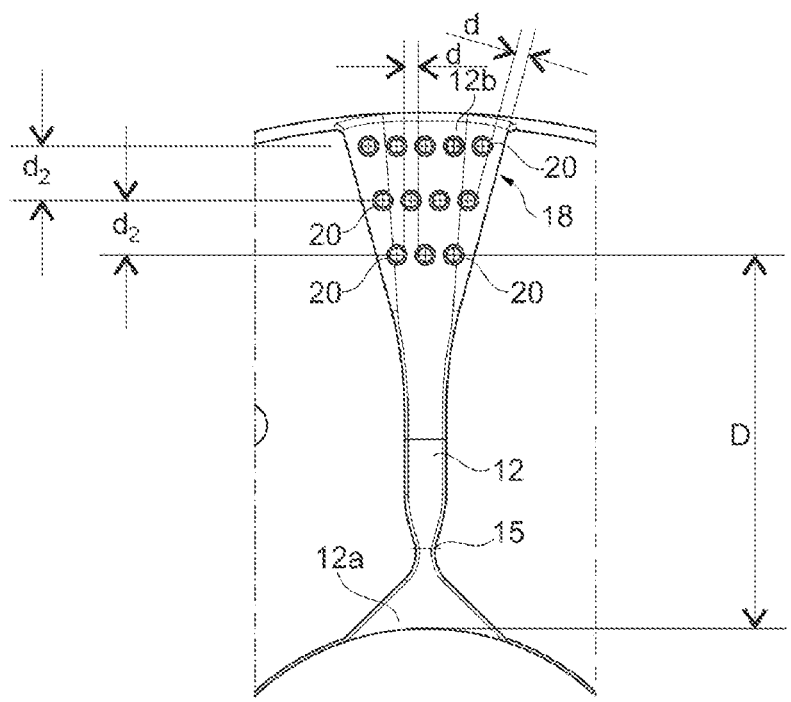
FIG. 9d is a view similar to FIG. 8 of an alternative embodiment.
Figure 10A:
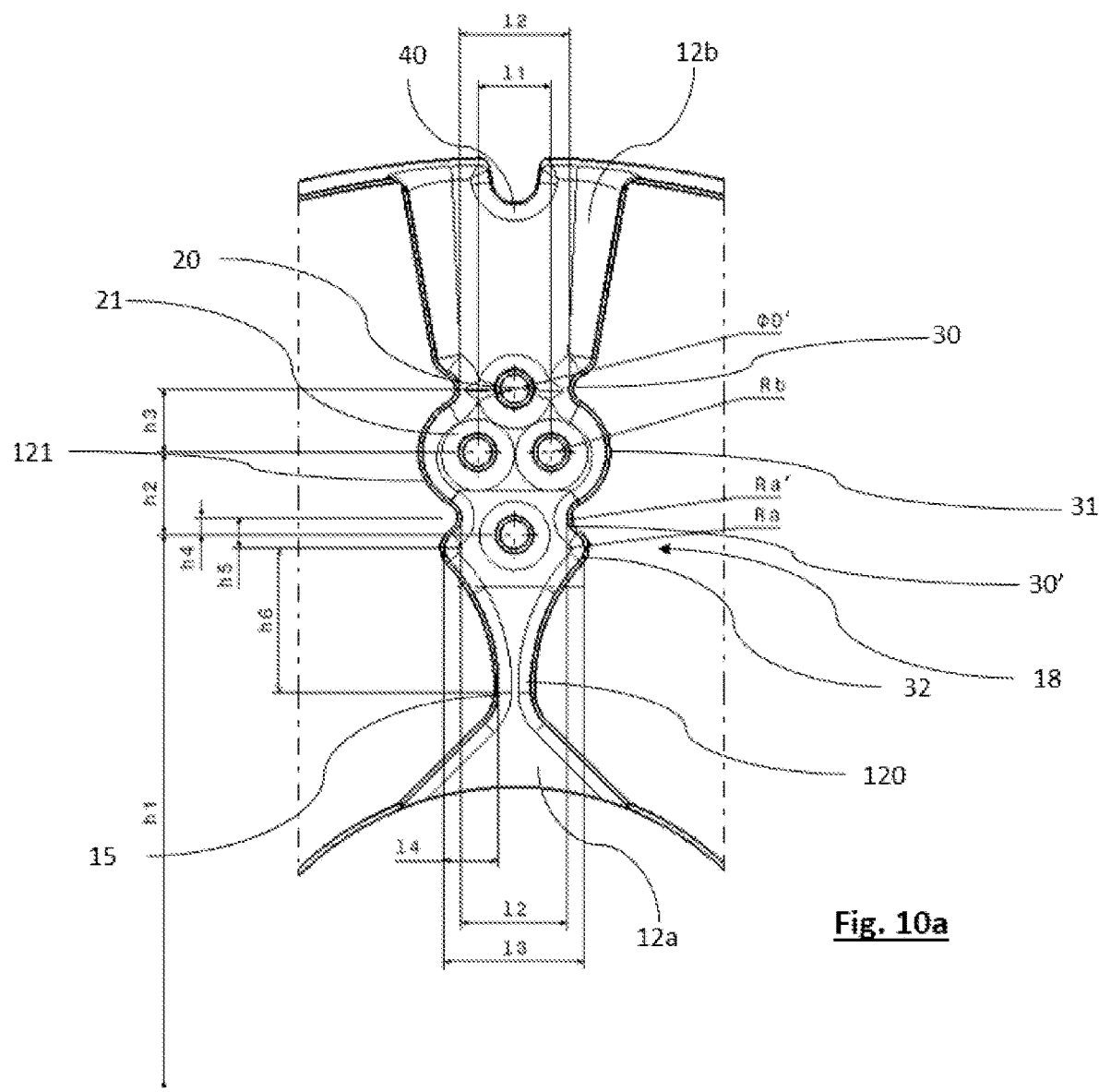
FIG. 10a is a view similar to FIG. 8 of an alternative embodiment.
Figure 10B:
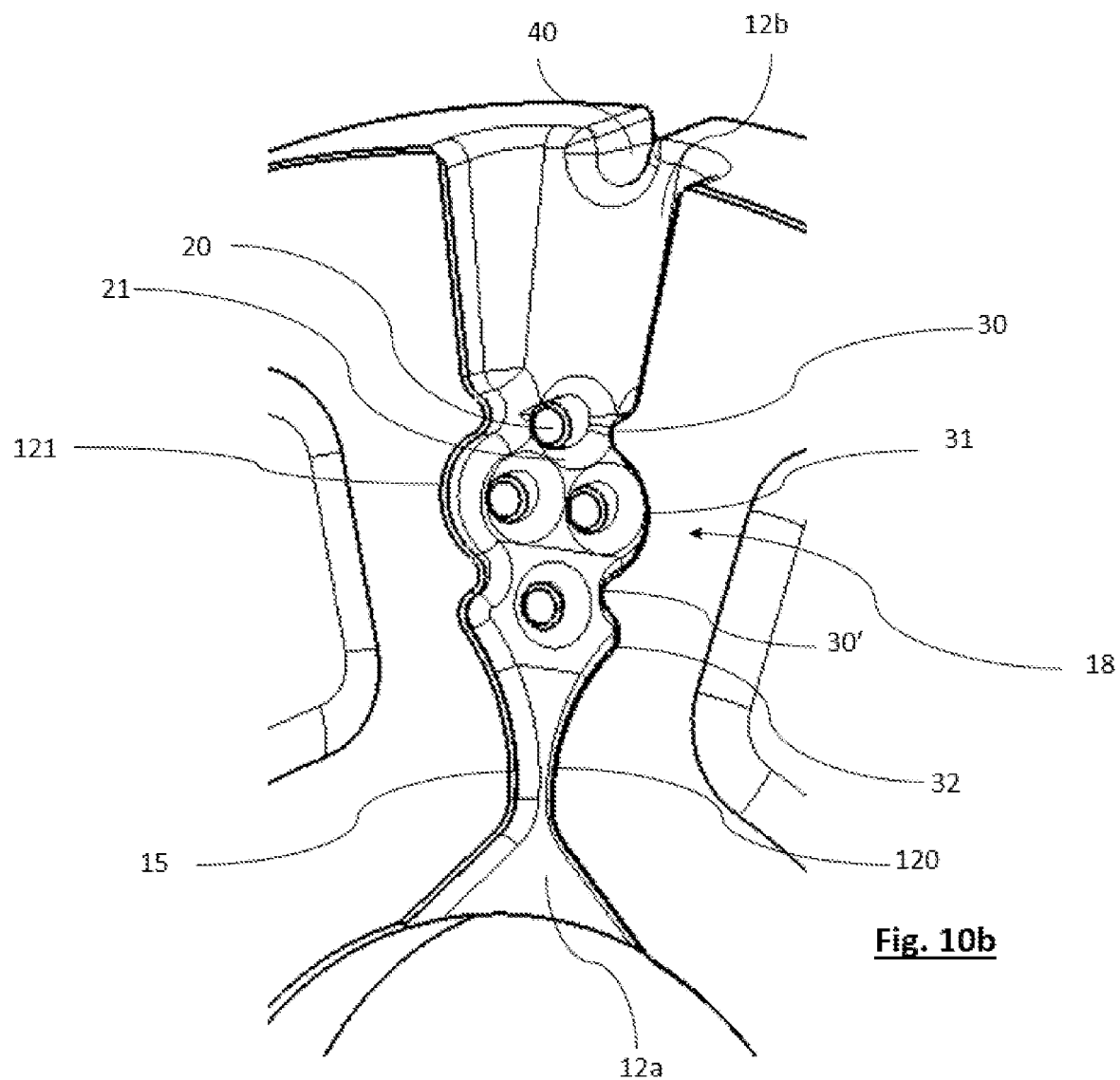
Figure 10D:
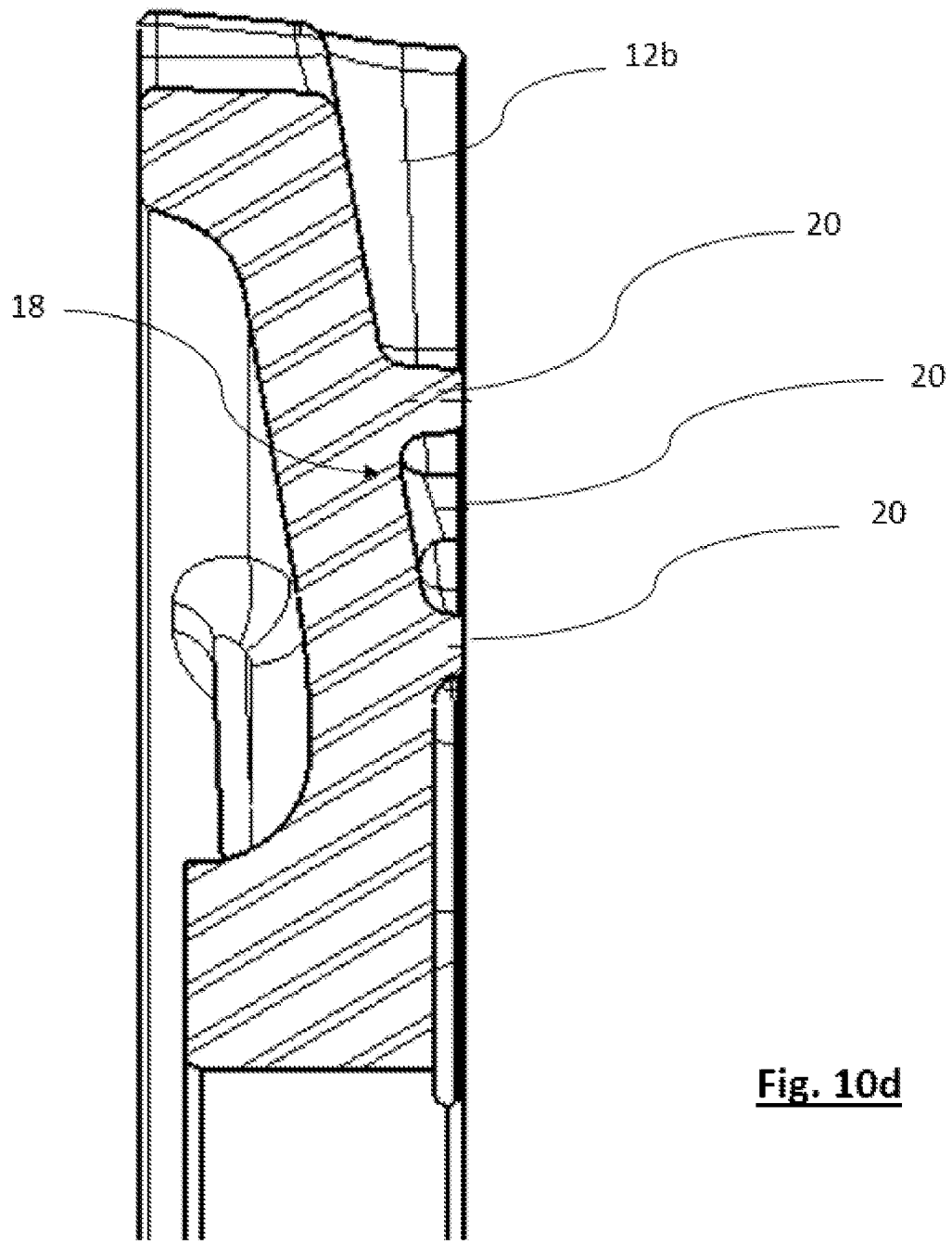

Again in one variant, the pins can be arranged in irregular staggered rows, with rows spaced apart by a larger gap d2, as shown in FIGS. 9c and 9d. The gap d2 may here be of the order of 3.7 mm. In the example of FIG. 9c, there are two rows of three and four pins, and in the example of FIG. 9d, there are three rows of 3, 4 and 5 pins.

In all these examples, a surface area of the cross-section of the spraying portion may be between 3 mm² and 30 mm², for example, of the order of 15 mm². It is calculated by deducting that of the possible pins.

Also in all these examples, the spraying portion is located in the last two-fifths of the feed channel, with a length D2, as seen when moving in the direction of circulation of the coolant. The length D2 of the feed channel is measured between the inlet thereof in the bottom of the end shield, at the shaft, and the top of the end shield, at the air gap, as shown in FIG. 8, for example.

The length D of the feed channel before the spraying portion is of the order of 26 mm. A ratio D/D2 is, for example, of the order of 0.8.

Furthermore, in the variant embodiment of FIGS. 4 to 8, the inlets 12a are not connected to one another, but each feed channel includes an inlet portion 12a flared in the direction of the rotational axis of the rotor. The two flared inlet portions 12a make it possible to collect the coolant coming from the rotor. The area of the flared inlet portion 12a measured in a plane perpendicular to the rotational axis of the rotor is in the example described of the order of 30 mm².

Figure 7:
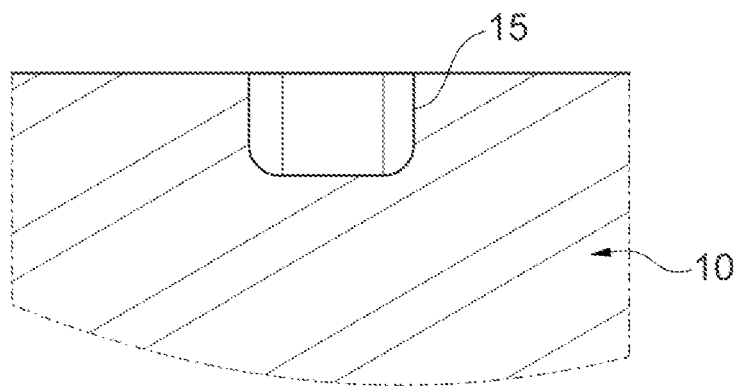
FIG. 7 is a view in detail, in cross-section, of the end shield of FIGS. 4 to 6.

In this example, the surface area of the cross-section of the constriction 15 is of the order of 2.4 mm². The shape of the cross-section of the constriction is in this example substantially rectangular, as shown in FIG. 7. In one variant, its shape could be square, circular, half-moon or otherwise, this list not being limiting.

Figure 6:
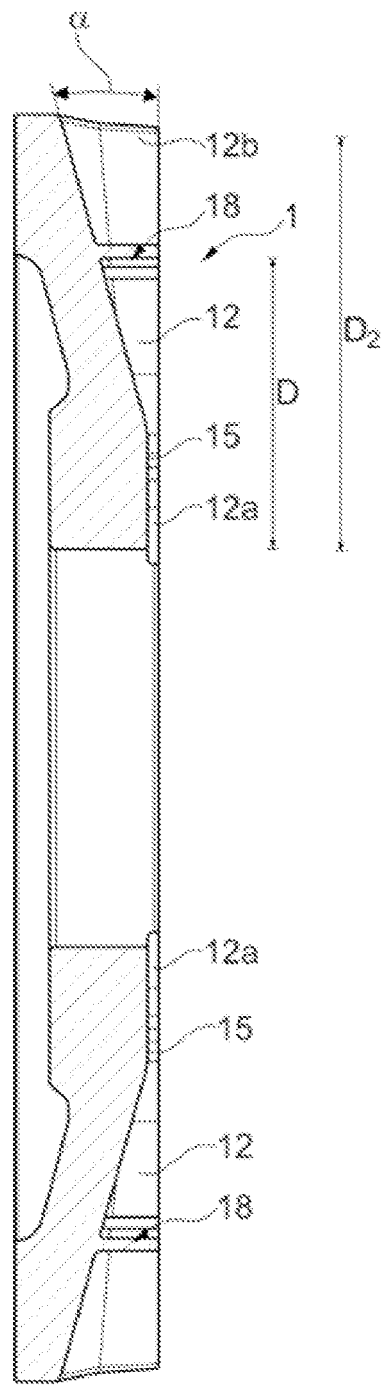
FIG. 6 is a schematic and partial sectional view of the end shield of FIG. 5.

Furthermore, the feed channel 12 includes a flared terminal portion 12b, located after the spraying portion, as seen when moving in the direction of circulation of the coolant. The flared terminal portion 12b opens onto the outer edge of the end shield. It includes a bottom inclined at an angle α relative to a plane perpendicular to the rotational axis of the rotor, as shown in FIG. 6. The angle α here is of the order of 15°. The flared terminal portion also forms a flare angle β in this plane perpendicular to the rotational axis of the rotor, as can be seen in FIG. 8. Here, the flare angle β is of the order of 30°.

In the example of FIGS. 10a, 10b, 10c and 10d, the spraying portion 18 includes four pins 20 distributed in three rows. The first and third rows each include one pin 20 and the second row includes two pins 20. The gap h2 between the first row and the second row is of the order of 4.5 mm. The gap h3 between the second row and the third row is of the order of 3.5 mm. The gap between the first row and the second row is greater than the gap between the second row and the third row, the pins 20 are therefore arranged in irregular staggered rows. The pin 20 of the third row includes two fins.

The diameter D' of the pins is of the order of 2 mm.

In this embodiment, the feed channel further includes a constriction 15 of its cross-section. This constriction is arranged between the inlet 12a of the channel and the spraying portion 18.

Each pin has a free space 21 around its periphery, that is, a space where there is no other pin or an edge of the channel. This free space has the shape of a disc centered on the pin and having a diameter of the order of 3 mm.

The edges 121 of the channel at the spraying portion each have a large trough 31, a small trough 32 and two bumps 30, 30'.

The three pins of the second and the third rows are arranged at an equal distance from each other. The distance between the pins is equal to the distance between each pin and the adjacent bump 30, 30'. Thus, there is no preferred passage for the coolant in the feed channel.

The radius of curvature Ra of the small trough 32 is of the order of 1 mm. The radius of curvature Rb of the large trough 31 is of the order of 3 mm. The small trough 32 is closer to the rotational axis X than the large trough 31. For each edge 121, the large trough 31 is arranged between the two bumps 30, 30'. The small trough 32 makes it possible to orient the flow of coolant towards the two pins of the second row so that it is diffused to form a mist of droplets.

The bumps 30, 30' all have the same radius of curvature Ra' which is of the order of 1 mm. The bump 30 furthest from the rotational axis X of the machine is aligned with the pin 20 of the third row. On the other hand, the bump 30' closest to the rotational axis X of the machine is slightly offset relative to the pin of the first row. The radius of curvature Ra of the small troughs is here equal to the radius of curvature Ra' of the bumps.

The distance h5 between the center of the bump 30' closest to the rotational axis of the machine and the center of the adjacent small trough 32 is of the order of 1.7 mm.

The flared terminal portion of the outlet 12b includes a notch 40 arranged on the edge face of the end shield and oriented radially to facilitate the orientation and the indexing of the end shield. In this embodiment, the edges 120 of the feed channel located between the inlet 12a and the spraying portion 18 are convex.

The ratio between the radius of curvature Rb of the large troughs and the diameter D' of the pins is between 0.2 and 3, better still between 1 and 2, being for example of the order of 1.33.

The distance l2 between the tops of the two bumps closest to the rotational axis X which are face-to-face is between 1 mm and 10 mm, better still between 3 mm and 8 mm, being for example of the order of 6 mm.

The distance l3 between the bottoms of the two troughs closest to the rotational axis X which are face-to-face is between 3 mm and 12 mm, better still between 4 mm and 10 mm, being for example of the order of 7.5 mm.

The ratio of the distance l2 between the tops of the two bumps closest to the rotational axis X on the diameter D' of the pins 20 is between 1 and 6, better still between 1.5 and 5, being for example of the order of 3.

The distance h1 between the first row of pins and the rotational axis of the rotor is of the order of 30 mm. The distance l1 between the centers of the two pins 20 of the second row is of the order of 4 mm.

The distance h4 between the center of the pin of the first row and the first bump 30' is between 0.2 mm and 3 mm, better still between 0.5 mm and 2 mm, for example is of the order of 1 mm.

The gap l4 between the bottom of the small trough 32 and the constriction 15 is between 1 mm and 7 mm, better still between 2 mm and 5 mm, being for example of the order of 3 mm.

The distance h6 between the bottom of the small trough closest to the rotational axis X and the constriction is between 3 mm and 12 mm, better still between 5 mm and 10 mm, being for example of the order of 7.8 mm.

Figure 11A:
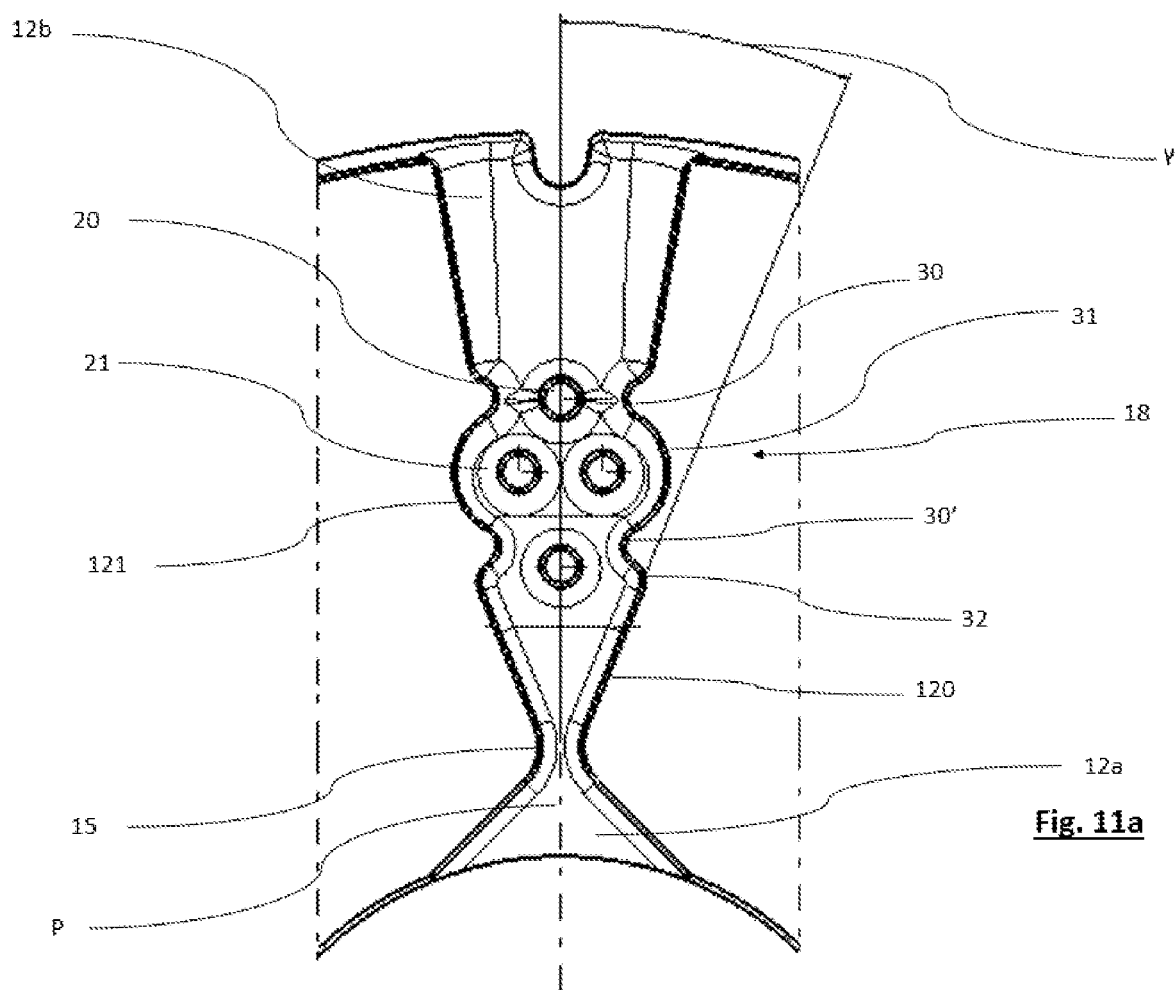
FIG. 11a is a view similar to FIG. 10a of an alternative embodiment.
Figure 11B:
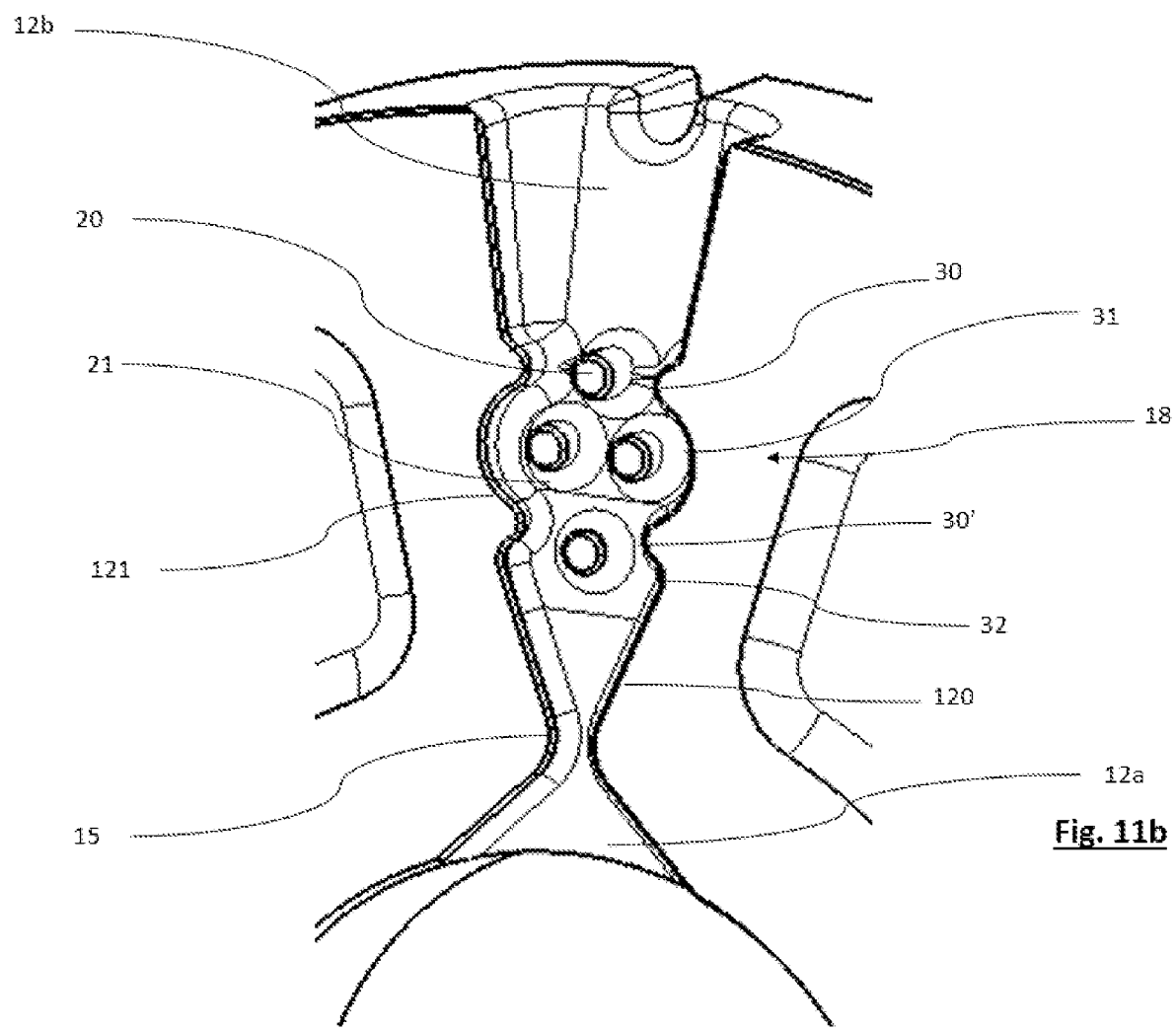

In the embodiment of FIGS. 11a and 11b, unlike that of FIGS. 10a to 10d, the edges 120 of the feed channel located between the inlet 12a and the spraying portion 18 are substantially rectilinear.

The edges 120 of the feed channel are inclined at an angle γ relative to a plane P containing the rotational axis of the machine. In the example shown, this angle γ is of the order of 22.5°.

Figure 12:
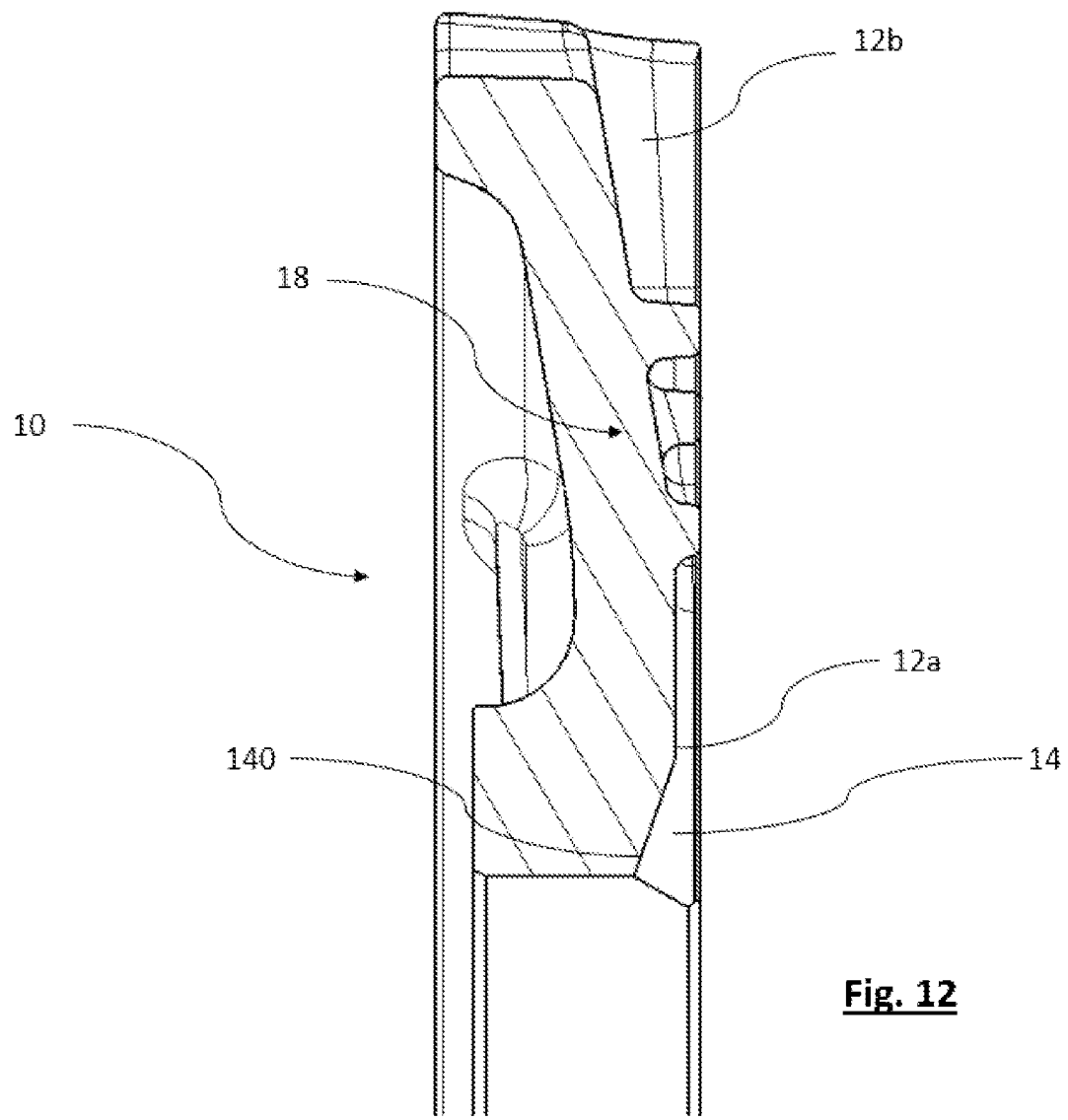
FIG. 12 is a schematic and partial sectional view of an end shield according to an alternative embodiment.

FIG. 12 shows a sectional view of an end shield according to a variant embodiment. The feed channels 12 of the end shield 10 each include an inlet 12a on the side of the rotational axis X of the rotor 1. These inlets are connected to one another at a radially inner end by an annular recess 14. In this embodiment, the bottom 140 of the annular recess is oblique. The bottom of the annular recess does not have a right angle, contrary to the embodiment of FIG. 6.

Of course, the methods and devices disclosed herein are not limited to the exemplary embodiments that have just been described.

For example, it is possible to produce the rotor with other coolant passages, for example oriented radially at approximately half the length of the stack or in contact with the magnets.

The invention claimed is:

1. An end shield for a rotary electric machine, including one or more feed channels for feeding a coolant supplied from a channel formed in a rotor lamination stack or in a shaft of a rotor or between the rotor lamination stack and the shaft, wherein at least one feed channel of the one or more feed channels has a spraying portion for spraying the coolant, said spraying portion being disposed in the last two thirds of the feed channel, when considered in the direction in which the coolant circulates, the end shield including a flared terminal portion located after the spraying portion, when moving in the direction of circulation of the coolant, the flared terminal portion including a bottom inclined at an angle α relative to a plane perpendicular to the rotational axis of the rotor, edges of the feed channel at the spraying portion each having a first trough, a second trough, and two bumps.

2. The end shield according to claim 1, the spraying portion of the at least one feed channel including one or more pins disposed across the coolant flow.

3. The end shield according to claim 2, the pins being molded or cast as one part with the rest of the end shield.

4. The end shield according to claim 2, the pins being oriented parallel to a rotational axis of the rotor.

5. The end shield according to claim 2, the pins being disposed in one or more rows.

6. The end shield according to claim 5, the pins being disposed in staggered rows.

7. The end shield according to claim 1, a surface area of the cross-section of the spraying portion being between 3 mm² and 30 mm².

8. The end shield according to claim 1, the flared terminal portion forming a flare angle β in the plane perpendicular to the axis of rotation of the rotor.

9. The end shield according to claim 8, the flare angle β being between 10° and 50°.

10. The end shield according to claim 1, the edges of the at least one feed channel having curved portions at the spraying portion.

11. The rotor of the rotary electric machine, including the rotor lamination stack and at least one end shield according to claim 1.

12. The rotor according to claim 11, wherein at least one axial channel for distributing the coolant to the end shield is formed in the rotor stack or between the rotor stack and the shaft, along the shaft.

13. The rotary electric machine including the rotor according to claim 11, and a stator.

14. The rotary electric machine according to claim 13, including the shaft on which an internal channel for supplying coolant runs over at least part of its length.

15. A method for cooling the rotary electric machine as defined in claim 13, wherein the coolant is circulated in opposite directions within the rotor, then the coolant is sprayed onto the coil heads of the stator.

16. The end shield according to claim 1, the angle α being between 2° and 30°.

17. The end shield according to claim 1 wherein the second trough is smaller than the first trough.

18. The end shield according to claim 1 wherein the two bumps are placed at opposite sides of the first trough.

19. An end shield for a rotary electric machine, including one or more feed channels for feeding a coolant supplied from a channel formed in a rotor lamination stack or in a shaft of a rotor or between the rotor lamination stack and the shaft, wherein at least one feed channel of the one or more feed channels has a spraying portion for spraying the coolant, said spraying portion being disposed in the last two thirds of the feed channel, when considered in the direction in which the coolant circulates, the end shield including a flared terminal portion, when moving in the direction of circulation of the coolant, the flared terminal portion including a bottom inclined at an angle α relative to a plane perpendicular to the rotational axis of the rotor, at least one feed channel of the one or more feed channels including a cross-sectional constriction, the cross-section of the at least one feed channel decreasing and then increasing in a radial direction relative to the rotational axis of the machine, as seen when moving in the direction of circulation of the coolant.

\* \* \* \* \*